US005555057A

United States Patent [19]
DiRisio

[11] Patent Number: 5,555,057
[45] Date of Patent: Sep. 10, 1996

[54] DIFFERENTIAL GEAR FOR MOTOR DRIVEN PHOTOGRAPHIC SYSTEM

[75] Inventor: Anthony DiRisio, Rochester, N.Y.

[73] Assignee: Eastman Kodak Company, Rochester, N.Y.

[21] Appl. No.: 443,648

[22] Filed: May 18, 1995

[51] Int. Cl.$^6$ .................................. G03B 1/00
[52] U.S. Cl. ........................................ 354/212
[58] Field of Search ............................ 354/212

[56] References Cited

U.S. PATENT DOCUMENTS

| | | | |
|---|---|---|---|
| 3,800,310 | 3/1974 | Umeda | 354/171 |
| 4,162,837 | 7/1979 | Haragushi | 354/173 |
| 5,025,277 | 6/1991 | Inoue et al. | 354/173.1 |
| 5,105,212 | 4/1992 | Kitazawa | 354/173.1 |
| 5,138,352 | 8/1992 | Maeno | 354/173.1 |
| 5,220,370 | 6/1993 | Hawai et al. | 354/173.1 |

Primary Examiner—Monroe H. Hayes
Attorney, Agent, or Firm—David A. Howley

[57] ABSTRACT

A differential gear mechanism for loading, advancing, rewinding and unloading photographic film, and in particular, film in a thrust film cartridge, for a photographic system. The differential gear includes a sun gear, which is rotatable, a planetary gear, which is rotatable by the sun gear, a drive spindle which is rotatable by the planetary gear to advance and rewind photographic film, a carrier plate, which is rotatable by the planetary gear, a drive gear, which is rotatable by the carrier plate for positioning the door of a film cartridge in either the open or closed position, and a torque control lever, for selectively locking or releasing one or both of the drive spindle and/or carrier plate so the planetary gear can selectively rotate one or both of the drive spindle or the carrier plate.

26 Claims, 26 Drawing Sheets

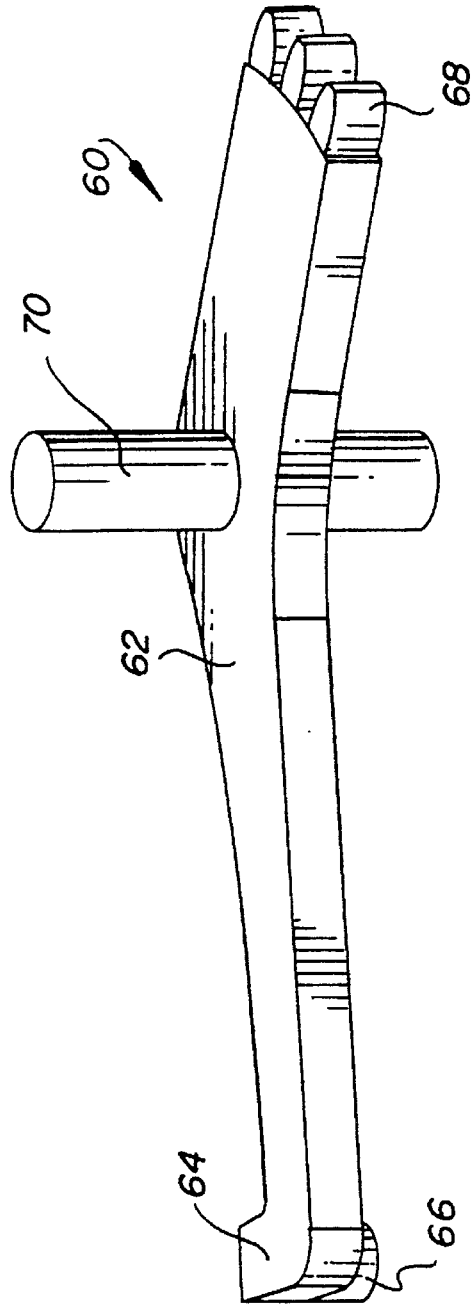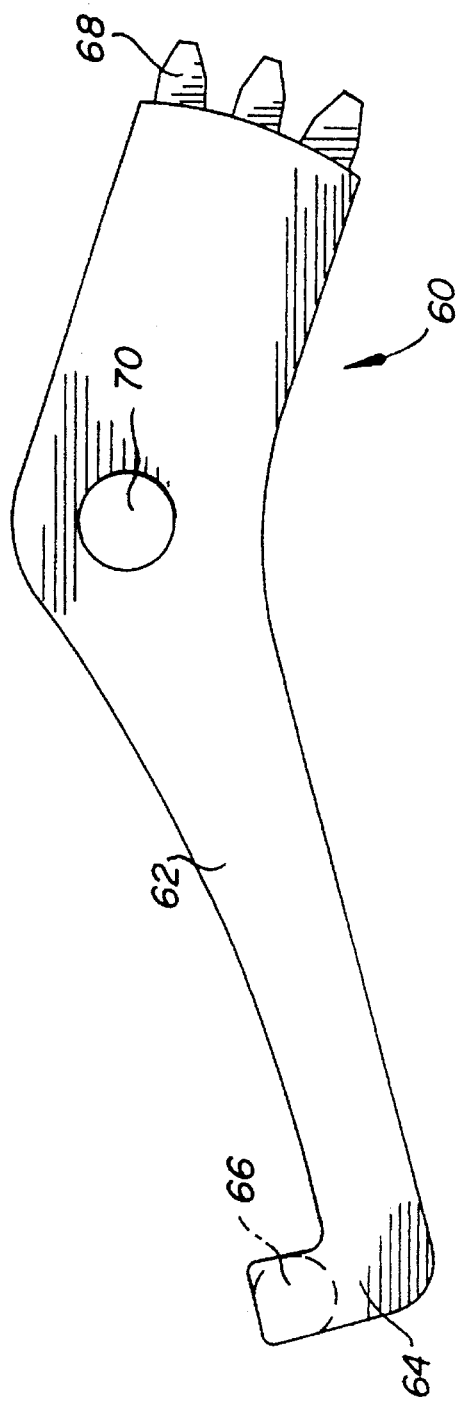

DIFFERENTIAL GEAR FOR MOTOR DRIVEN PHOTOGRAPHIC SYSTEM

FIELD OF THE INVENTION

The present invention generally relates to the field of motor driven photographic systems, more specifically, to motor driven photographic systems using differential gear mechanisms for loading and unloading a film cartridge and advancing and rewinding photographic film, and in particular, film in a thrust film cartridge.

BACKGROUND OF THE INVENTION

In conventional motor driven cameras, the camera is required to perform multiple mechanical operations. The camera's operations include, for example, winding and rewinding the photographic film, driving the camera's mirror and shutter, and, in autofocus cameras, driving the lens focal length. Generally, providing separate drive capability for mechanical operations performed by a photographic system increases the complexity and cost of the equipment undesirably. Thus, it is desirable to use a single drive motor to drive one or more of the camera's mechanical operations.

U.S. Pat. No. 4,162,837 by Haragushi, assigned to Ashai Kogaku Kogyo Kabushiki Kaisha, issued Jul. 31, 1979, discloses a motor drive device for a camera for winding and rewinding the film and driving the camera's shutter. U.S. Pat. No. 5,025,277 by Inoue, assigned to Olympus Optical Co., Ltd., issued Jun. 18, 1991, discloses a camera which includes a motor and gear mechanism for winding and rewinding the film and switching the focal length of a photographic lens. U.S. Pat. No. 5,105,212 by Kitazawa, assigned to Ashai Kogaku Kogyo Kabushiki Kaisha, issued Apr. 14, 1992, discloses a motor driven camera for winding and rewinding the film and driving the shutter and the diaphragm.

The drive motor mechanisms disclosed in the above described references are not applicable to cameras using thrust film cartridges. Thrust film cartridges utilize film door light traps as an alternative to conventional film cartridges utilizing plush light traps. Typical thrust film cartridges include an outer shell having a longitudinally-extending opening allowing for the exit of film from the cartridge. A cartridge spool is rotatably positioned within the outer shell to accommodate a roll of film. A film door is rotatably mounted adjacent the opening and is movable between a closed position, wherein a light tight seal is formed, and an open position, wherein film is allowed to exit the cartridge.

Thrust film cartridges are particularly useful for allowing rewinding, removal and subsequent reloading of the film cartridge before the complete roll of film is used. Cameras which allow for the rewinding, removal and reloading of partially-used rolls of film are sometimes referred to as mid-roll interrupt cameras. Such a camera is disclosed in commonly-assigned U.S. Pat. Nos. 4,947,197 to Smart et al. and 4,965,600 to Smart et al., which are incorporated in their entirety herein by reference.

In order to ready the film within the camera for exposure, the film door of the thrust film cartridge must first be opened. Further, in order to ready the film cartridge for return to the camera user, the film door of the thrust cartridge must be closed after the film has been completely rewound into the film cartridge. Thus, it would be desirable to provide a differential gear mechanism, which, in addition to advancing and rewind the film, also operates to open and close the film cartridge door.

It would be desirable to provide a method of selectively constraining and/or releasing portions of a differential gear mechanism to direct a motor's drive power to the operations of opening the film cartridge door, advancing the film, rewinding the film and closing the film cartridge door. It would be desirable to provide purely mechanical operation to open and close the film cartridge door to avoid the need for electromechanical devices to ensure the door is fully open or fully closed. It would be desirable to provide a mechanical operation, as opposed to an electromechanical operation, to detect whether the film has been completely rewound in the film cartridge before initiating the operation of closing the film cartridge door. It would be desirable to provide a purely mechanical film door release option which can be activated only after film cartridge door is closed.

SUMMARY OF THE INVENTION

One embodiment of the present invention utilizes a differential gear mechanism to control the application of the drive forces during the various stages of a motor driven photographic system's operation. These forces are directed to advancing or rewinding film loaded in the photographic system or driving operations other than advancing or rewinding film, including opening and closing the door of a film cartridge. It should be noted that other operations of the photographic system can also be included in the operation of the differential gear mechanism of the present invention.

The differential gear mechanism of the present invention is implemented by selectively constraining or releasing a component of the differential gear mechanism according to the operation to be performed. In accordance with one embodiment of the invention, the differential gear mechanism includes a drive spindle, which engages a film cartridge, for advancing and rewinding the film within the cartridge, and a carrier plate, selectively meshed with a drive gear, for opening and closing the film cartridge door. In this embodiment of the invention, the drive spindle or the carrier plate is selectively constrained from time to time to allow the differential gear mechanism to advance or rewind the film or to open and close the film cartridge door.

In another embodiment of the invention, the differential gear mechanism further includes a torque control lever for selectively constraining the drive spindle or the carrier plate by the torque control lever engaging a portion of the drive spindle or the carrier plate. In an alternative embodiment of the present invention, the drive spindle or the carrier plate can be selectively constrained by mechanical stops located on other components of the differential gear mechanism.

In yet another embodiment of the invention, the differential gear mechanism further includes a sun gear, which is rotated by a motor, and a planetary gear, which is rotatable in accordance with the rotation of the sun gear. In this embodiment of the invention, when the drive spindle of the differential gear mechanism is constrained, the drive forces of a motor are directed to operations other than advancing or rewinding the film. Preferably, the drive forces of the motor are directed to opening or closing the film cartridge door. However, it is noted that a differential gear mechanism of the present invention can be designed with constrained and unconstrained operations which provide different results.

BRIEF DESCRIPTION OF THE DRAWINGS

FIG. 11 is a perspective view of the torque control lever component of the differential gear mechanism of FIG. 1.

FIG. 12 is a view of the torque control lever component of the differential gear mechanism of FIG. 1.

DETAILED DESCRIPTION

Figure 1:
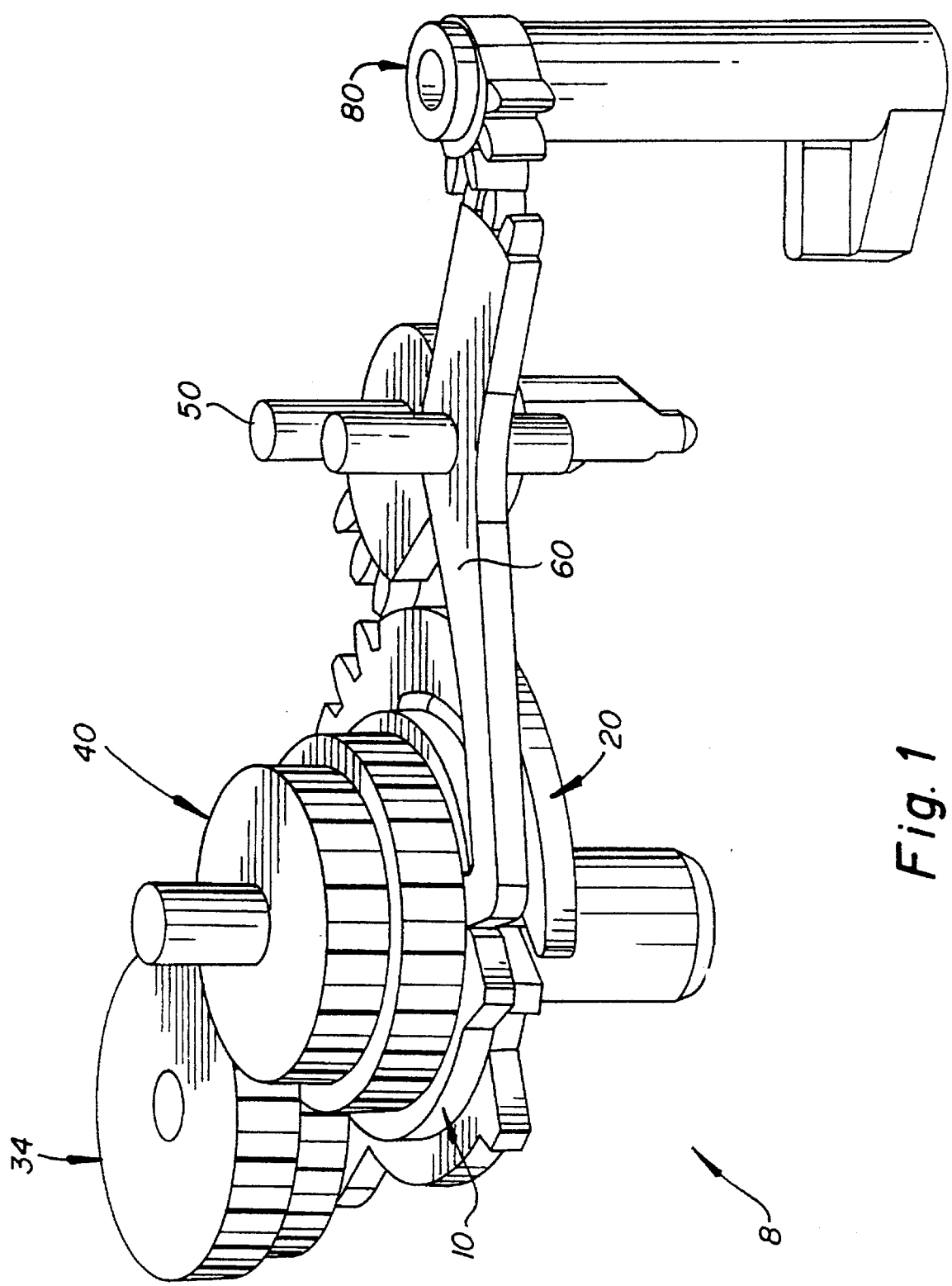
FIG. 1 is a perspective view of the components of an embodiment of a differential gear mechanism in accordance with the present invention.
Figure 2:
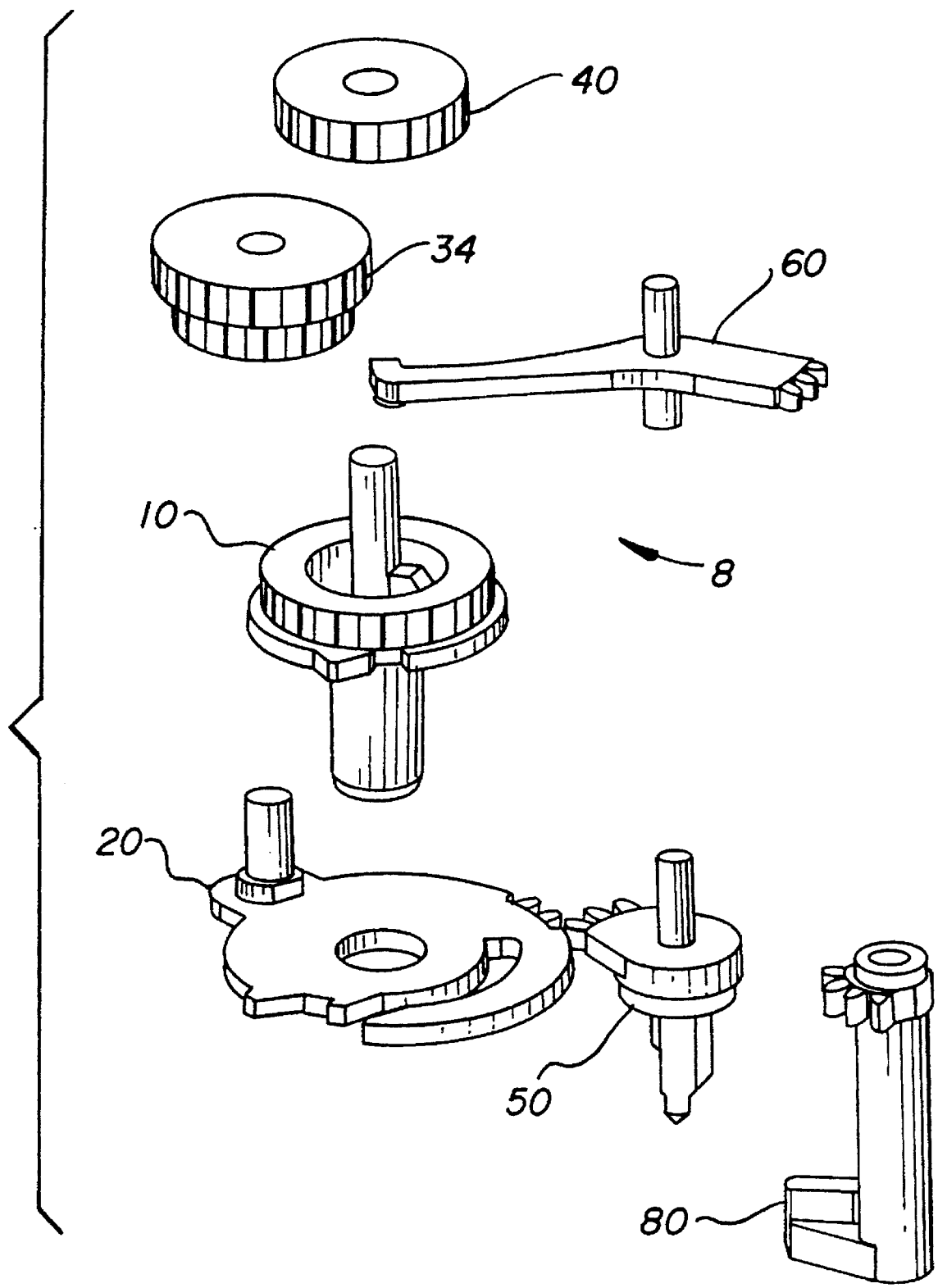
FIG. 2 is an exploded perspective view of the components of the differential gear mechanism of FIG. 1.

An embodiment of a differential gear mechanism 8 in accordance with the present invention is illustrated in FIGS. 1 and 2. The illustrated differential gear mechanism 8 generally comprises a drive spindle 10, a carrier plate 20, a planetary gear 34, a sun gear 40, a drive gear 50, a torque control lever 60 and a film presence sensor 80.

Figure 3:
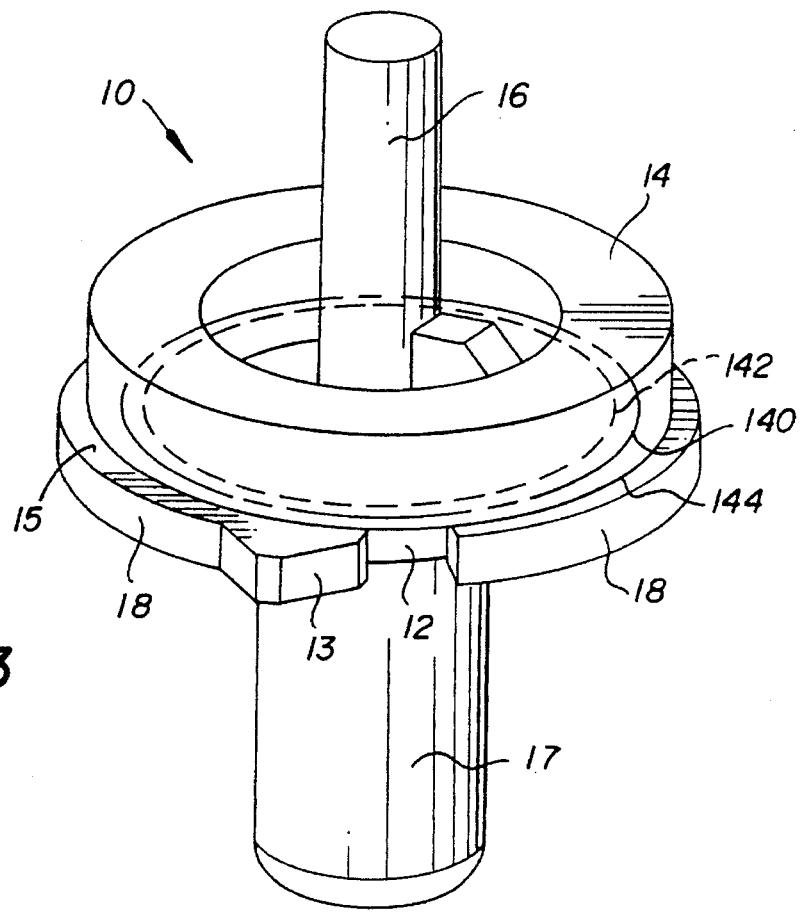
FIG. 3 is a perspective view of the drive spindle component of the differential gear mechanism of FIG. 1.

As shown by FIG. 3, the drive spindle 10 comprises a first notch 12, a first tab 13, a spindle gear 14, a lower plate 15, a upper pin 16 and a lower pin 17. Although not explicitly shown, the spindle gear 14 has gear teeth along its entire circumference. The line 140 represents the center line of the spindle gear 14. The line 142 represents the dedendum circle of the spindle gear 14. The line 144 represents the addendum circle of the spindle gear 14.

Figure 4:
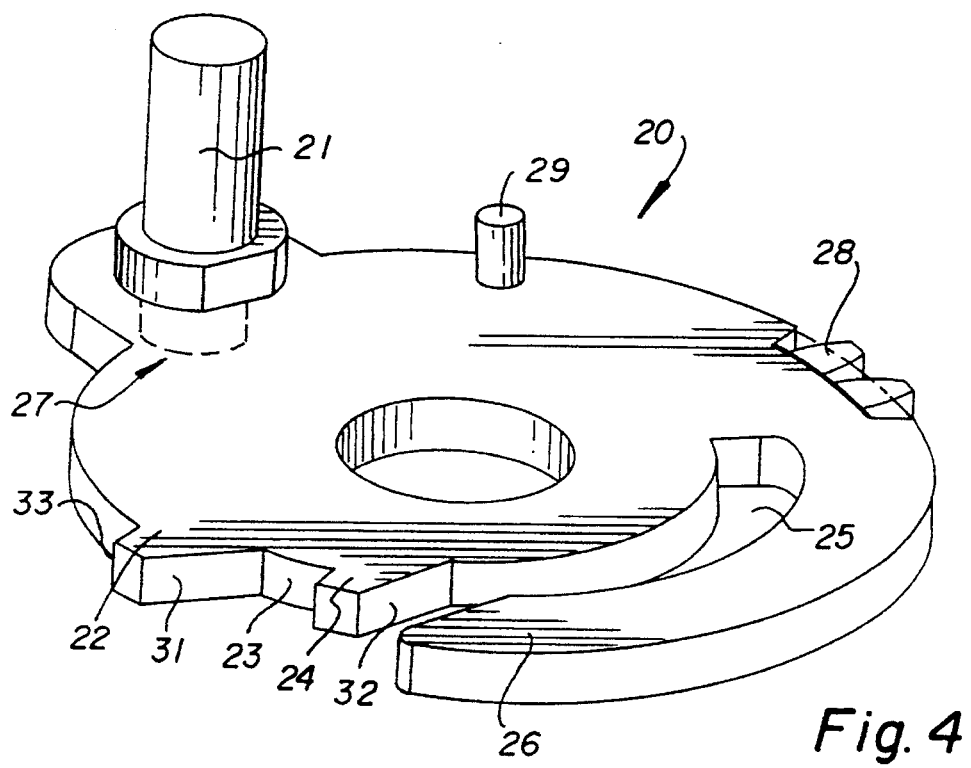
FIG. 4 is a perspective view of the carrier plate component of the differential gear mechanism of FIG. 1.
Figure 5:
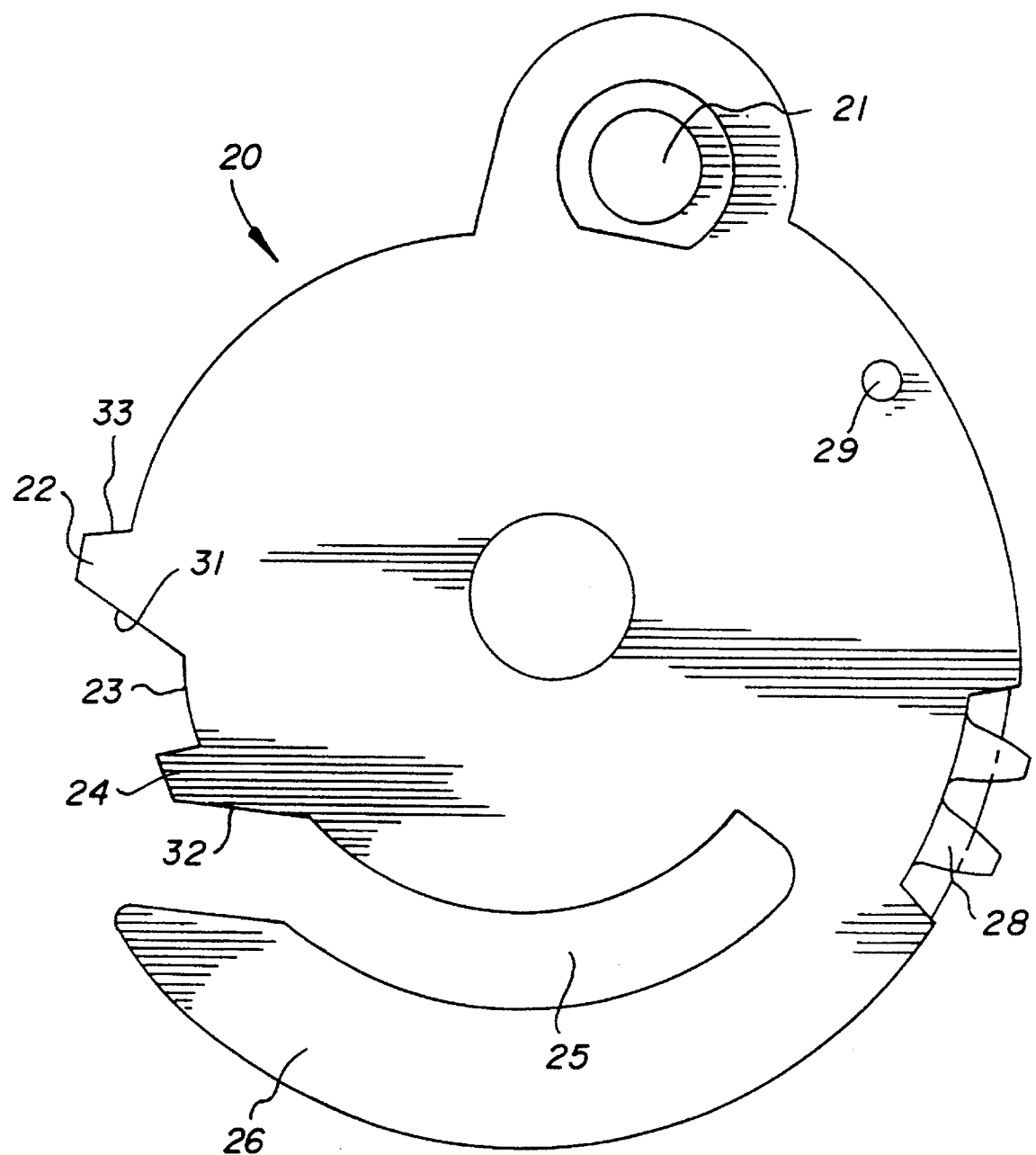
FIG. 5 is a view of the carrier plate component of the differential gear mechanism of FIG. 1.
Figure 6:
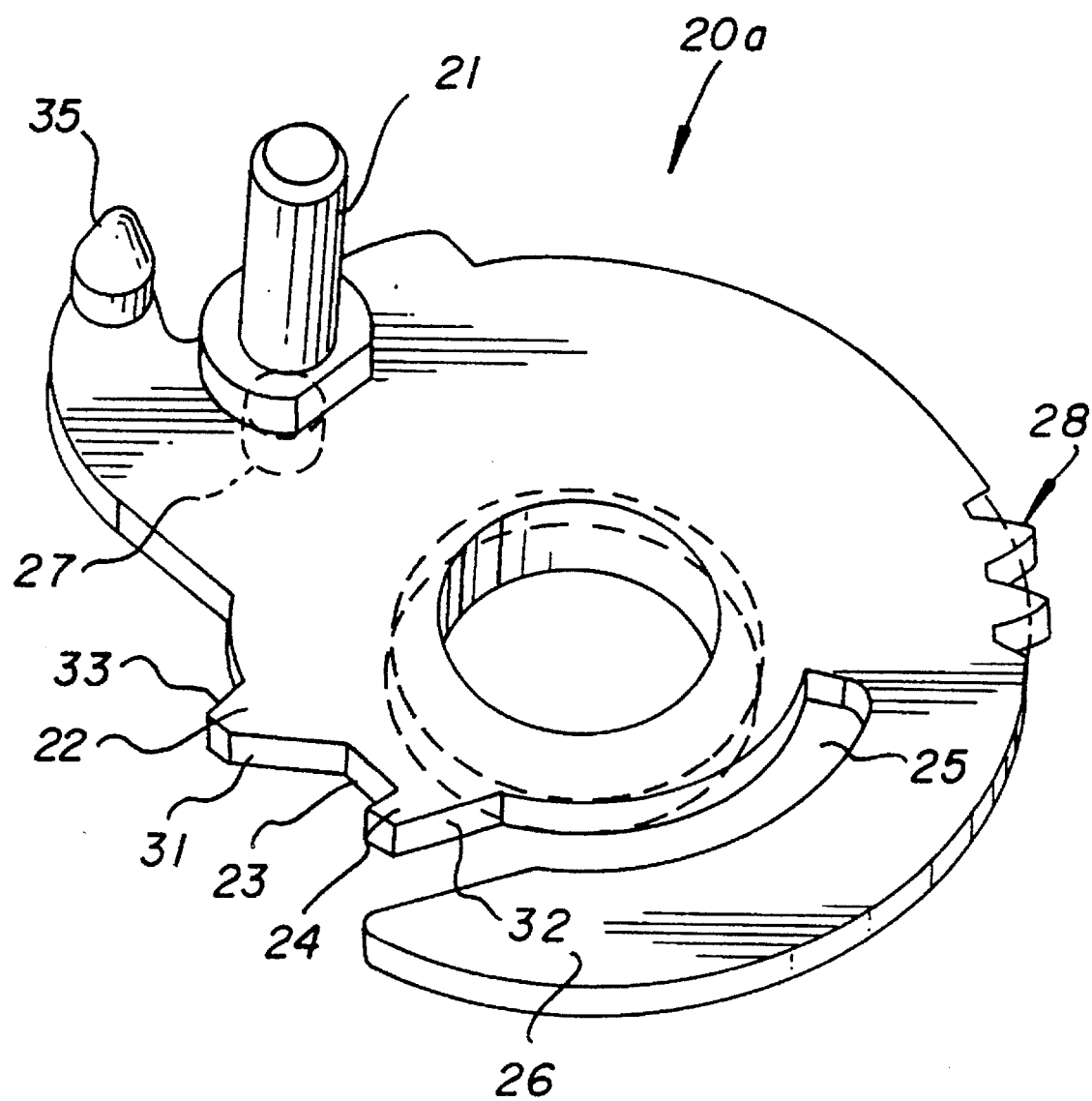
FIG. 6 is a perspective view of an alternative embodiment of the carrier plate component for use with the differential gear mechanism shown in FIG. 1.
Figure 7:
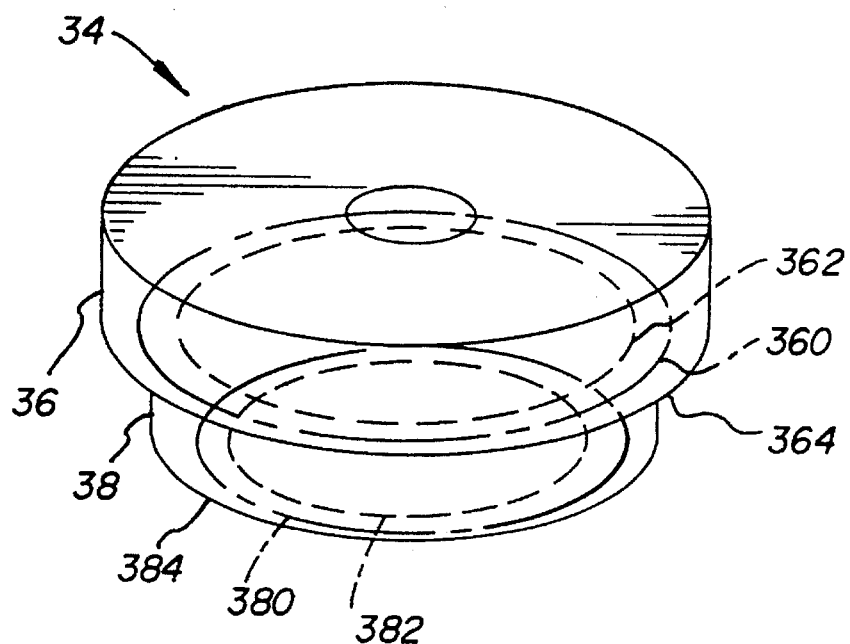
FIG. 7 is a perspective view of the planetary gear component of the differential gear mechanism of FIG. 1.

As shown by FIGS. 4 and 5, the carrier plate 20 comprises a first post 21, a second tab 22 having a ramped surface 31 and an inclined surface 33, a second notch 23, a third tab 24 having a ramped surface 32, a slot 25, a finger 26, a second post 27 directly opposite the first post 21, a carrier plate gear sector 28 and a door release pin 29. An alternative embodiment of the carrier plate 20a is shown in FIG. 6. The carrier plate 20a is shown with the added element of an ejector release pin 35. As shown in FIG. 7, the planetary gear 34 comprises a upper gear 36 and a lower gear 38. Although not explicitly shown, the upper gear 36 and the lower gear 38 have gear teeth along their entire circumferences. The line 360 represents the center line of the upper gear 36. The line 362 represents the dedendum circle of the upper gear 36. The line 364 represents the addendum circle of the upper gear 364. The line 380 represents the center line of the lower gear 38. The line 382 represents the dedendum circle of the lower gear 38. The line 384 represents the addendum circle of the lower gear 384.

Figure 8:
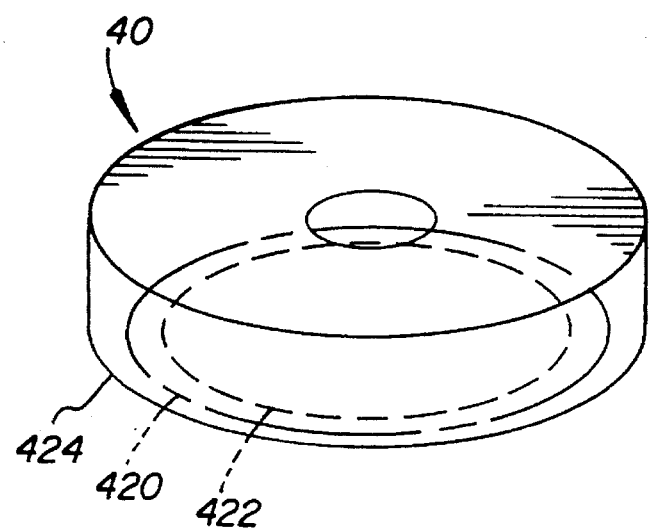
FIG. 8 is a perspective view of the sun gear component of the differential gear mechanism of FIG. 1.
Figure 10:
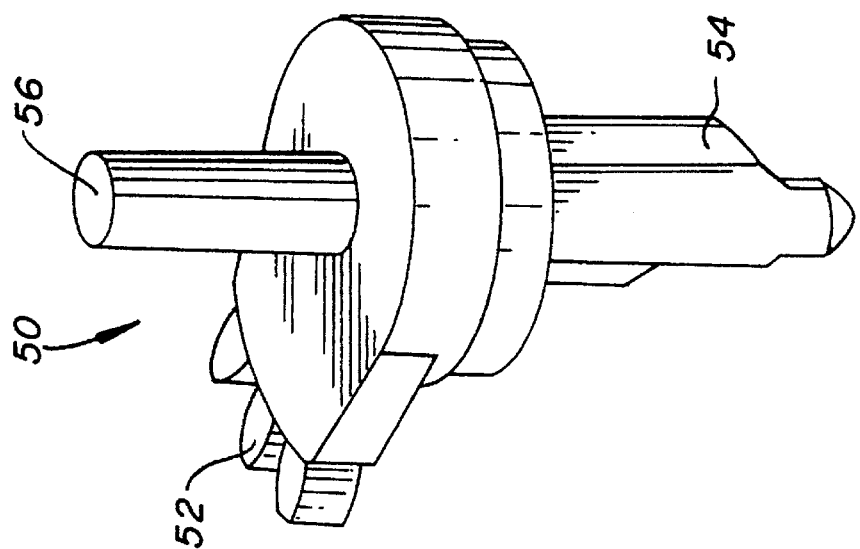
FIG. 10 is a perspective view of the drive gear component of the differential gear mechanism of FIG. 1.
Figure 9:
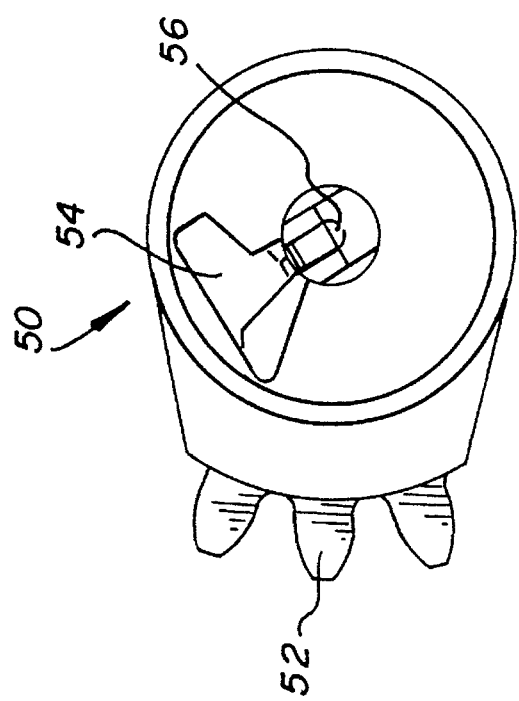
FIG. 9 is a view of the drive gear component of the differential gear mechanism of FIG. 1.
Figure 14:
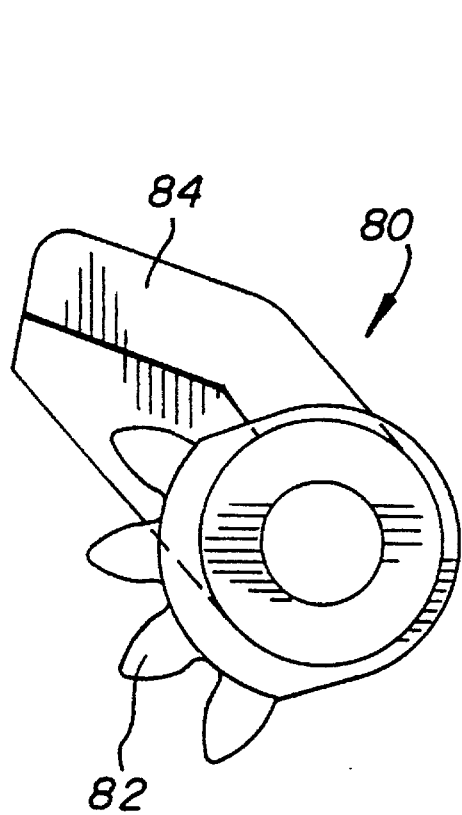
FIG. 14 is a view of the film presence sensor component of the differential gear mechanism of FIG. 1.
Figure 13:
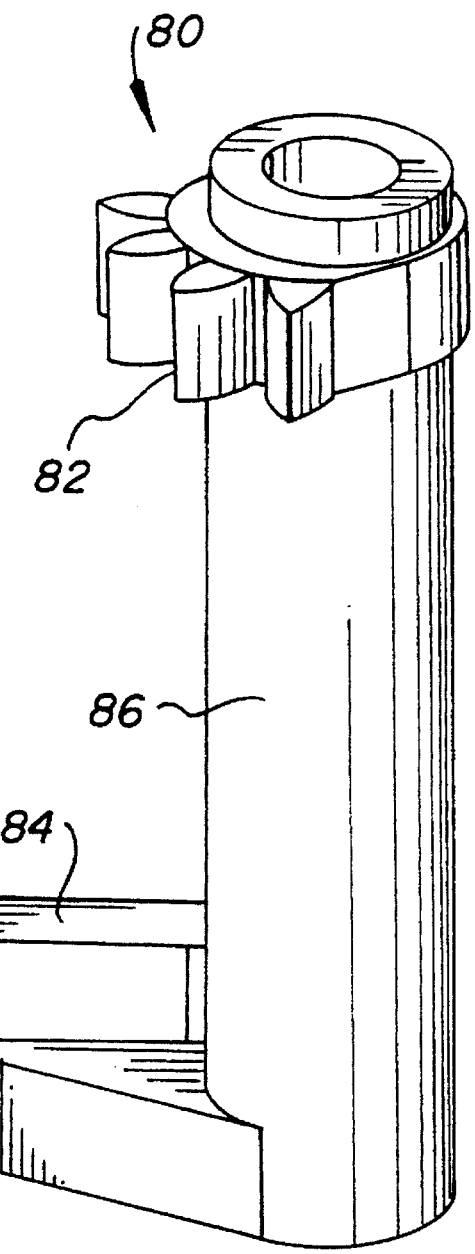
FIG. 13 is a perspective view of the film presence sensor component of the differential gear mechanism of FIG. 1.
Figure 15:
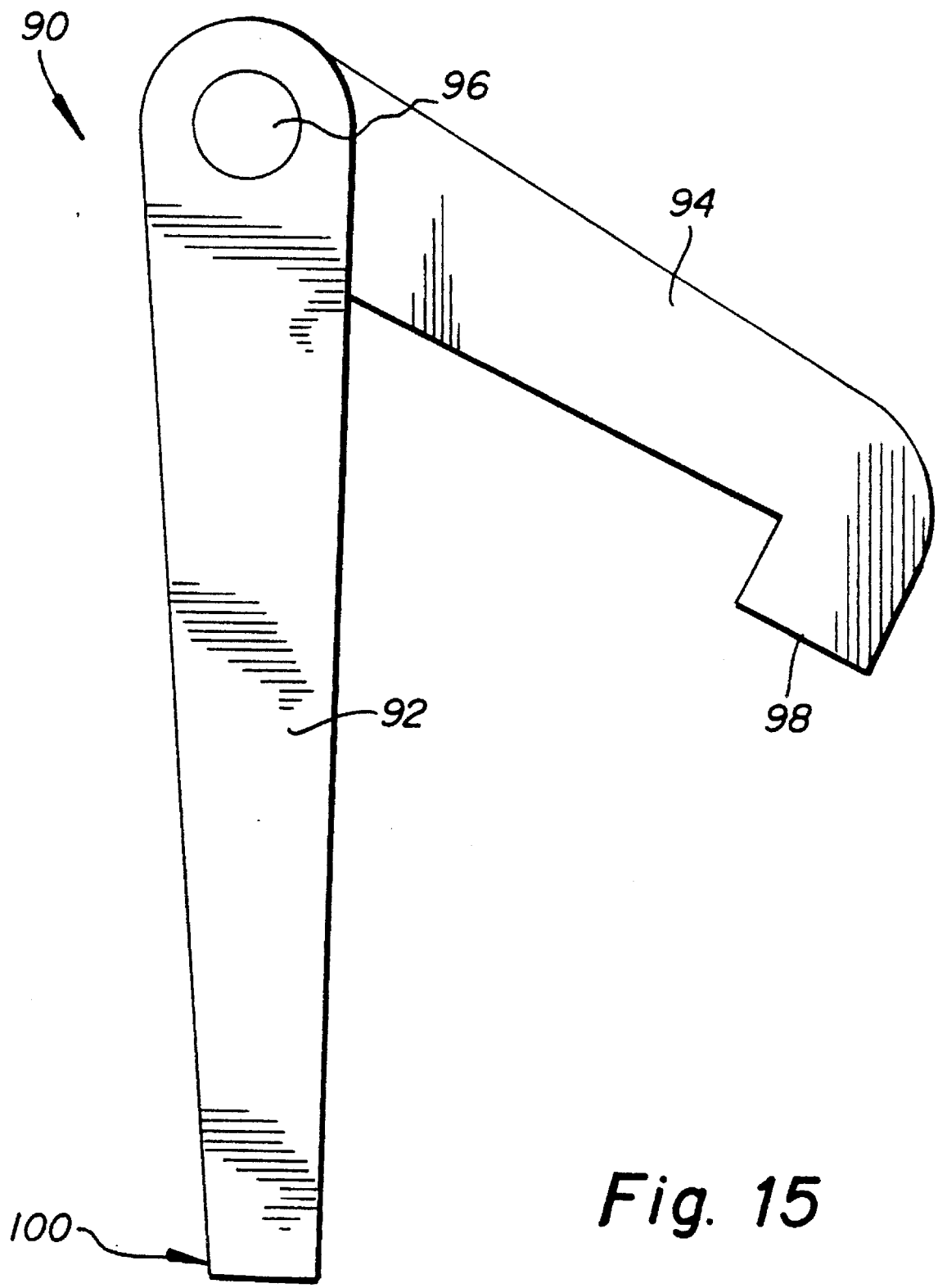
FIG. 15 is a view of the camera door lever component of the differential gear mechanism of FIG. 1.
Figure 16:
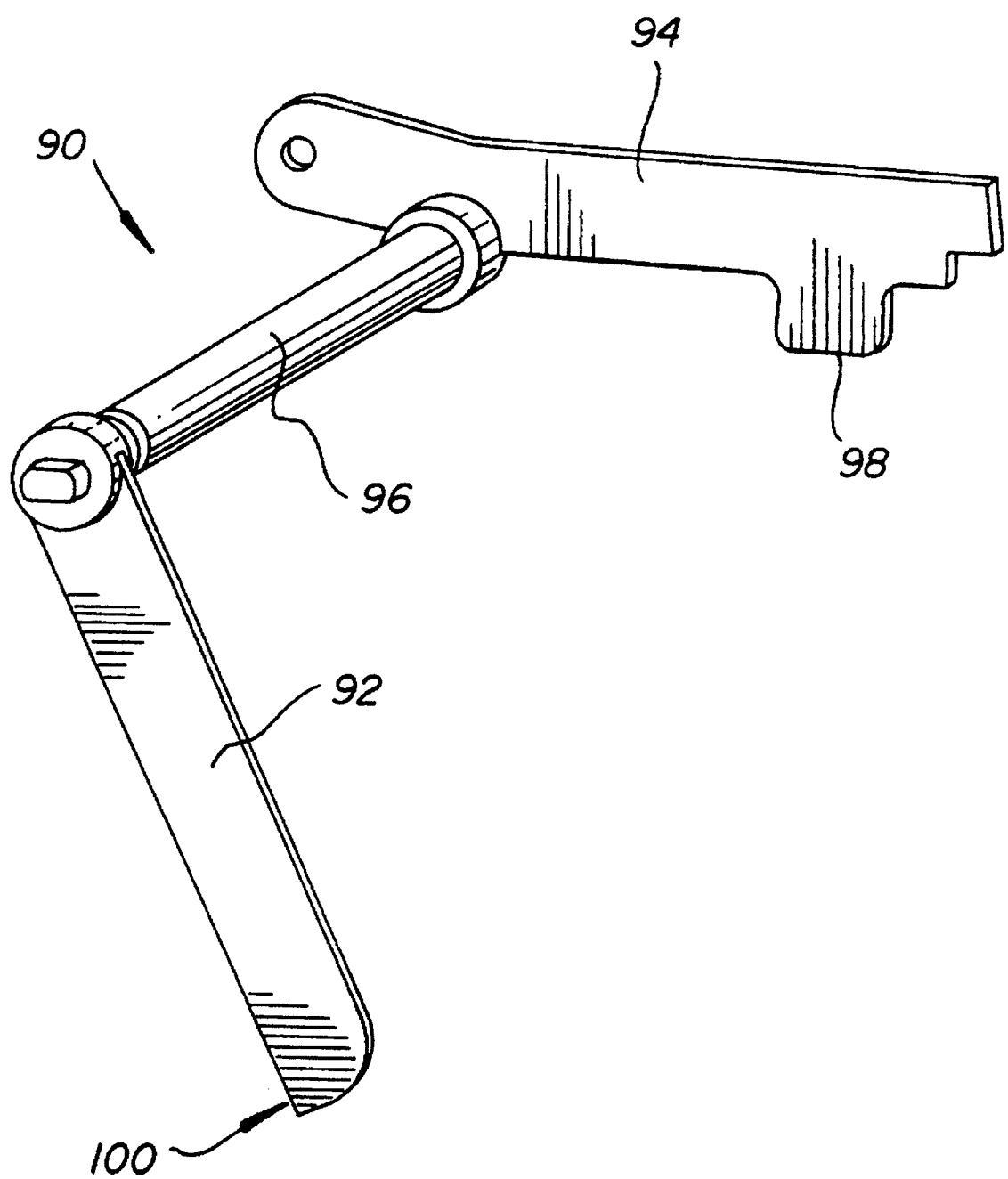
FIG. 16 is a perspective view of the camera door lever component of the differential gear mechanism of FIG. 1.

The sun gear 40 is shown in FIG. 8. Although not explicitly shown, the sun gear 40 has gear teeth along its entire circumference. The line 420 represents the center line of the sun gear 40. The line 422 represents the dedendum circle of the sun gear 40. The line 424 represents the addendum circle of the sun gear 40. As shown in FIGS. 9 and 10, the drive gear 50 comprises a drive gear sector 52, a drive key 54 and drive gear shaft 56. As shown in FIGS. 11 and 12, the torque control lever 60 comprises a lever 62, a pawl 64, a torque control lever pin 66, a torque control lever gear sector 68 and a torque control shaft 70. As shown in FIGS. 13 and 14, the film presence sensor 80 comprises a film presence sensor gear sector 82, a film presence sensor arm 84 and a film presence sensor shaft 86. As shown in FIGS. 15 and 16, the camera door lever 90 comprises a first arm 92, a second arm 94, a post 96, a lock 98 and a first end 100 of the first arm 92.

As shown in FIGS. 1 and 2, the sun gear 40 is rotatably positioned on the upper pin 16 of the drive spindle 10 and the carrier plate 20 is rotatably positioned on the lower pin 17 of the drive spindle 10. Further, the planetary gear 34 is rotatably positioned on the post 21 of the carrier plate 20 and the upper gear 36 and the lower gear 38 of the planetary gear 34 are meshed with the sun gear 40 and the spindle gear 14 of the drive spindle 10, respectively. The torque control lever 60 is rotatable about the torque control shaft 70 and given a tendency of being rotatable in the clockwise direction under the force of a spring (not shown). The drive gear 50 is rotatable about the drive gear shaft 56 and the film presence sensor 80 is rotatable about the sensor shaft 86.

The differential gear mechanism of the present invention is for use in any system which uses photographic film, such as cameras, film development equipment and systems which allow the viewing and printing of processed film contained within a film cartridge. Preferably, the differential gear mechanism is used in motor driven photographic systems. More preferably, the differential gear mechanism is used in photographic systems using thrust film cartridges to load and unload the film cartridge, and to advance and rewind the film contained within the film cartridge. For ease of description, the operation of a preferred embodiment of the differential gear mechanism 8 is described below. However, it should be noted that the differential gear mechanism's operations are seamlessly integrated.

FILM CARTRIDGE LOADING

Figure 17:
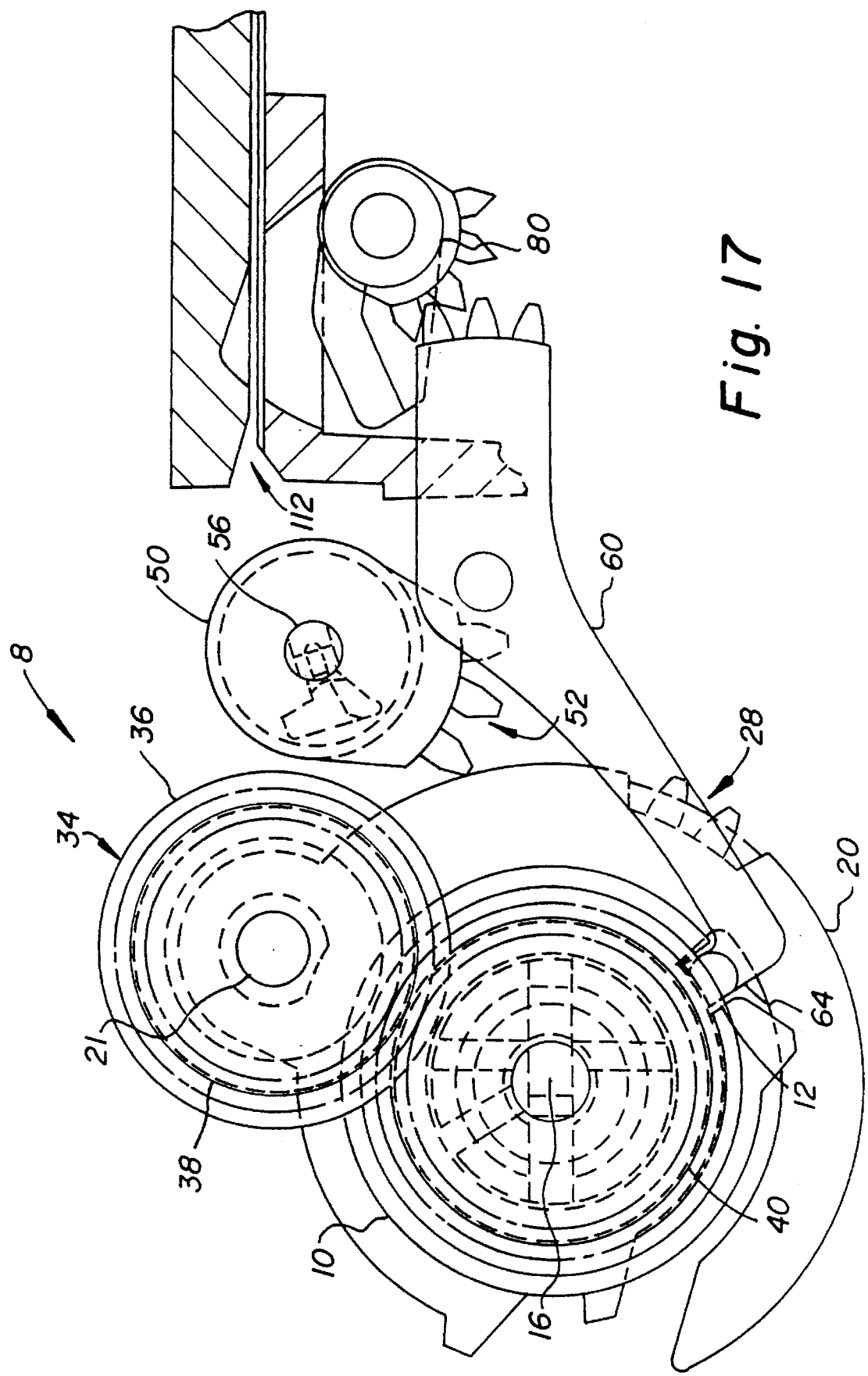
FIG. 17 is a top view of the components of the differential gear mechanism of FIG. 1, positioned prior to the film cartridge door being opened.

FIG. 17 shows the components of an embodiment of a differential gear mechanism 8 in accordance with the present invention, positioned ready to receive a film cartridge (not shown) and to initiate loading the film cartridge. In this position, the pawl 64 of the torque control lever 60 engages the first notch 12 on the drive spindle 10, thus constraining the drive spindle 10 from rotating about the upper pin 16. The position of the pawl 64 engaging the first notch 12 is referred to as the drive spindle 10 being "locked." Typically, a user of a camera (not shown) inserts the film cartridge into the loading chamber (not shown) and closes the camera's door. As a consequence of the insertion, the film cartridge spool (not shown) engages the drive spindle 10 via the lower pin 17 and the film cartridge door (not shown) engages the drive gear 50 via the drive key 54. In view of the insertion, the film cartridge cannot move. Further, in view of the locked drive spindle 10, the film cartridge spool cannot move.

Figure 18:
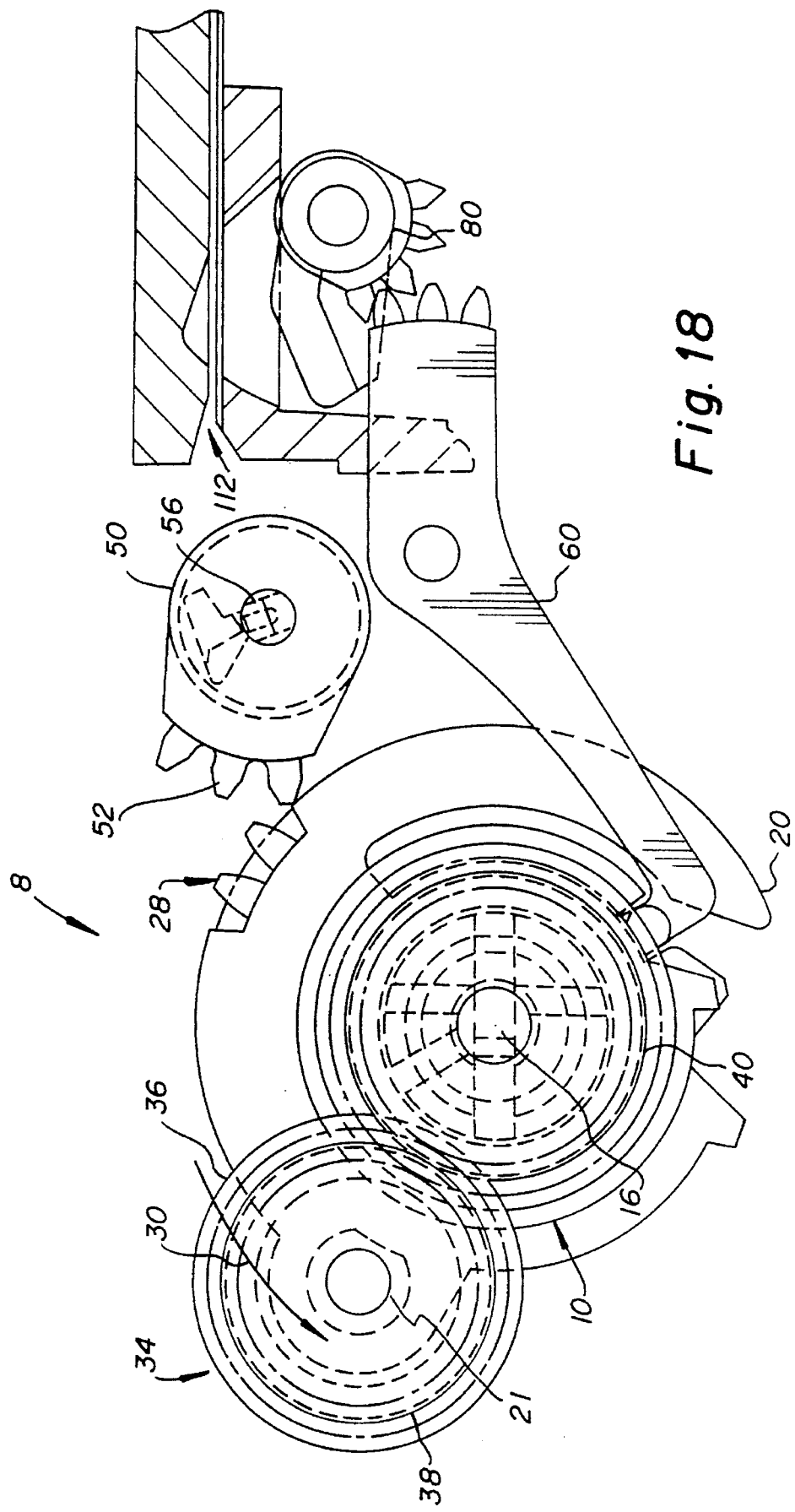
FIG. 18 is a top view of the components of the differential gear mechanism of FIG. 1, positioned after opening the film cartridge door and before the drive spindle is unlocked.

In order to fully load the film cartridge, the film cartridge door must be opened. FIG. 17 shows the position of the components of the differential gear mechanism 8 prior to the film cartridge door being opened. FIG. 18 shows the position of the components of the differential gear mechanism 8 after the film cartridge door (not shown) has been opened. Initiation of sequence of steps to open the film cartridge door can occur automatically upon the closing of the loading chamber door or by camera user initiation, such as the camera user pressing the shutter release button.

With reference to FIGS. 17 and 18, the sun gear 40 is rotated in the clockwise direction under the drive force of a motor (not shown) which occurs by means known to those skilled in the art. The clockwise rotation of the sun gear 40 causes the planetary gear 34 to rotate counter clockwise due to the upper gear 36 being meshed with the sun gear 40. The lower gear 38 of the planetary gear 34, is meshed with the spindle gear 14 of the drive spindle 10, which is presently locked by pawl 64. Consequently, the counter clockwise rotation of planetary gear 34 causes the planetary gear 34 to move counter clockwise along the circumference of the spindle gear 14 of the drive spindle 10, giving the impression that the planetary gear 34 is orbiting the sun gear 40. As the planetary gear 34 moves counter clockwise along the circumference of the spindle gear 14, the carrier plate 20 rotates counter clockwise about the lower pin 17 of the drive spindle 10 due to the planetary gear 34 being rotatably mounted on the first post 21 of the carrier plate 20.

As shown in FIG. 17, the drive key 54 of the drive gear 50 starts in the "closed" position. Initially, as the carrier plate 20 rotates counter clockwise, the drive gear sector 52 contacts a portion of the carrier plate 20 which has no gear teeth. The length of the toothless portion of the carrier plate 20 provides a desired delay or dwell time. The purpose of the dwell time is to allow other camera operations to be performed, including other camera operations by the differential gear mechanism, before the cartridge door is opened. As the carrier plate 20 continues to rotate counter clockwise, the carrier plate gear sector 28 engages the drive gear sector 52, which causes the drive gear 50 to rotate clockwise about the drive gear shaft 56. As shown in FIG. 18, the clockwise rotation of the drive gear 50 causes the drive key 54 to move to the "open" position which causes the film cartridge door (not shown) to open. Once the cartridge door is open, the carrier plate gear sector 28 disengages from the drive gear sector 52, whereupon the drive gear sector 52 contacts a second portion of the carrier plate 20 which has no gear teeth.

Figure 19:
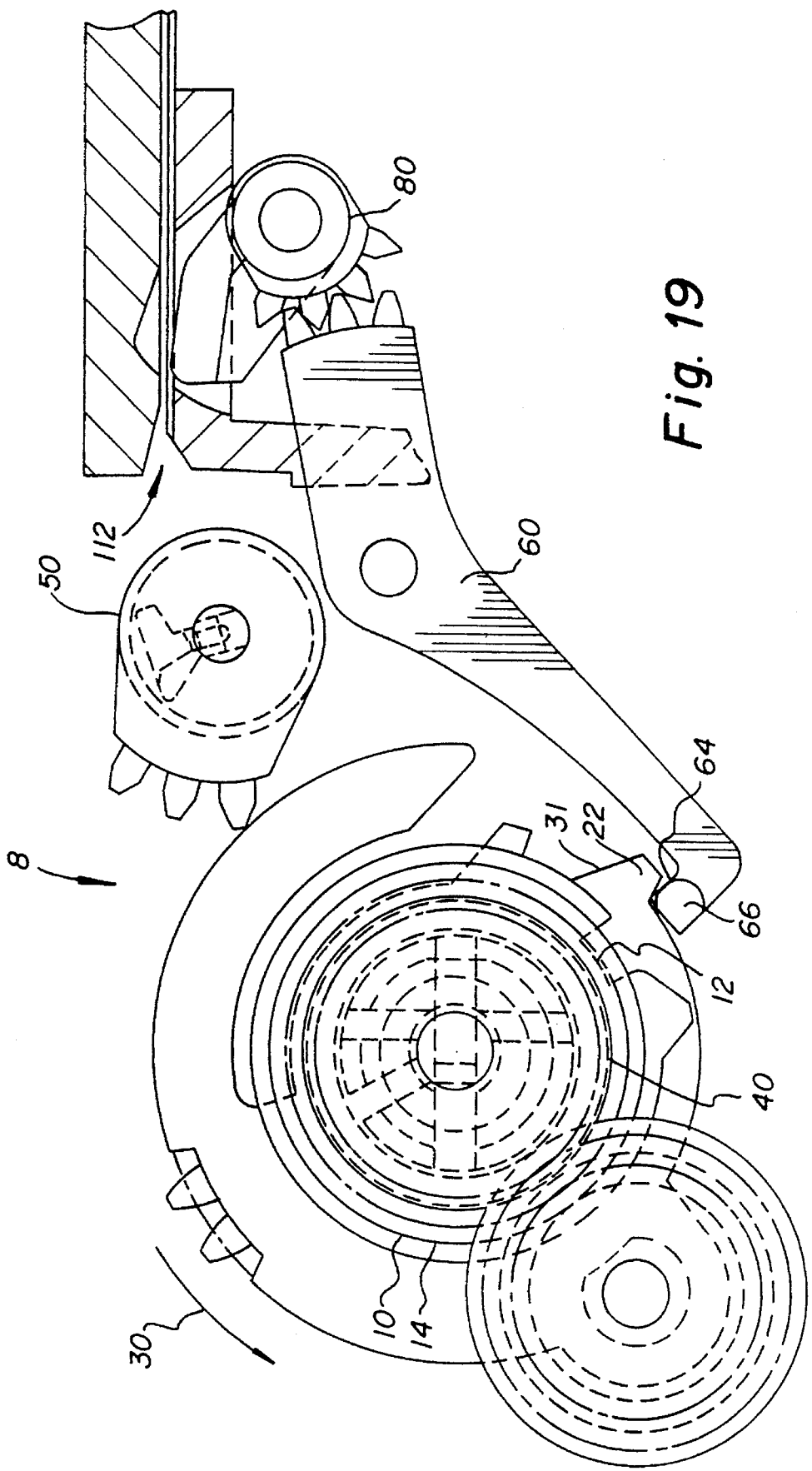
FIG. 19 is a top view of the components of the differential gear mechanism of FIG. 1, positioned after the drive spindle has been unlocked.

After the film cartridge door has been opened, the drive spindle 10 must be unlocked before the film (not shown) can be advanced from the film cartridge (not shown) into the film gate 112. FIG. 18 shows the position of the components of the differential gear mechanism 8 after the cartridge door has been opened and before the drive spindle 10 is unlocked. FIG. 19 shows the positioning of the components of the differential gear mechanism 8 after the drive spindle 10 is unlocked.

With reference to FIGS. 18 and 19, the drive force of the motor (not shown) continues to rotate the carrier plate 20 counter clockwise (the torque on the carrier plate 20 is represented by the arrow 30). Eventually, the third tab 24 of the carrier plate 20 engages the torque control lever pin 66 of the torque control lever 60. In this regard, the torque control lever pin 66 rides up the ramped surface 32, over the third tab 24 and into the second notch 23, thereby causing the pawl 64 to disengage from the first notch 12 of the drive spindle 10. When the drive spindle 10 is released by pawl 64, the drive spindle 10 is no longer constrained and is referred to as being "unlocked."

By virtue of the drive spindle 10 becoming unlocked, the drive force of the motor (not shown) is split between the drive spindle 10 and the carrier plate 20. As a result, the drive force of the motor (not shown) continues to apply a counter clockwise torque on the carrier plate 20 (as represented by the arrow 30), causing the carrier plate 20 to continue to rotate counter clockwise along the circumference of the spindle gear 14. Eventually, the second tab 22 engages the torque control lever pin 66 and the torque control lever pin 66 rides up the ramped surface 31 and over the second tab 22. At this point, the torque is still applied on the carrier plate 20 in the counter clockwise direction. The carrier plate 20 is prevented from rotating further in the counter clockwise direction by the second post 27 engaging a tab (not shown) located on the photographic system, and thus, becomes locked.

FILM ADVANCE

Film advancement occurs when the film cartridge is fully loaded, as described above, and film 110 is thrusted from the film cartridge and into the film gate 112 to position the film 110 for exposure action by the camera's user. Film advancement occurs automatically following film cartridge loading or initiation of an exposure action.

In the circumstance where film advancement occurs automatically following film cartridge loading, the drive force of the motor (not shown) rotates the sun gear 40 in the clockwise direction thereby causing the planetary gear 34 to rotate counter clockwise. In view of the unlocked drive spindle 10 and carrier plate 20, the drive force of the motor is split between the drive spindle 10 and the carrier plate 20. As a result, the drive spindle 10 to rotates in the clockwise direction. As a result, the film spool rotates and thrusts the film 110 through the opened film cartridge door and into the film gate 112. The film 110 is advanced into the film gate 112 until the first unexposed frame is positioned ready for exposure action to be initiated by the camera user.

In the circumstance where film advancement occurs automatically following an exposure action, the advancement of the film 110 occurs by the drive force of the motor (not shown) rotating the sun gear 40 in the clockwise direction thereby causing the planetary gear 34 to rotate counter clockwise. In view of the unlocked drive spindle 10 and locked carrier plate 20, the drive force of the motor is applied to the drive spindle 10 and the drive spindle 10 rotates in the clockwise direction, causing additional film 110 to be advanced through the opened film cartridge door and into the film gate 112 until the next unexposed frame is positioned ready for exposure action to be initiated by the camera user.

FILM REWIND

Figure 20:
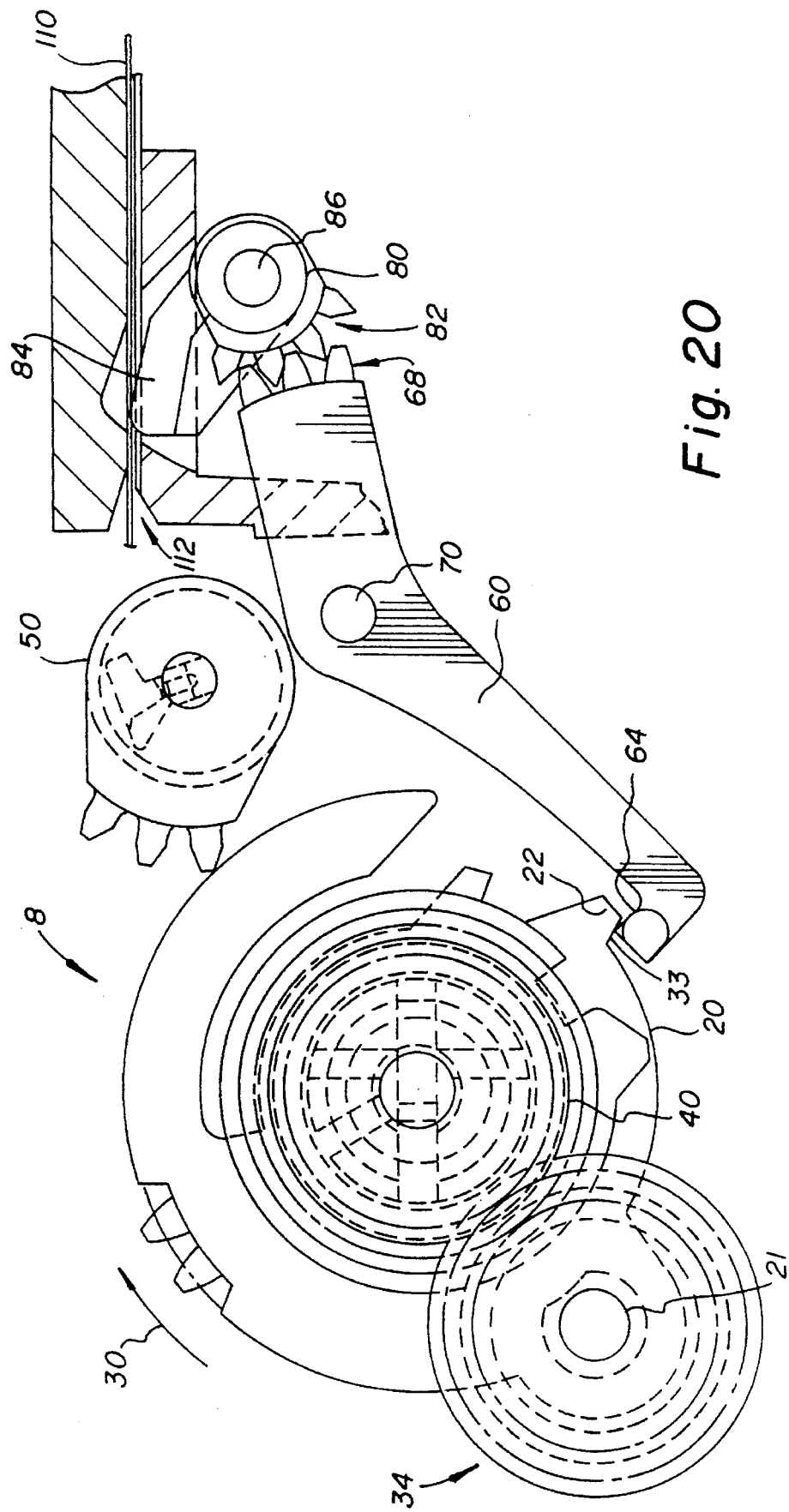
FIG. 20 is a top view of the components of the differential gear mechanism of FIG. 1, positioned during the rewinding of the film into the film cartridge, showing the film presence sensor arm engaging the film in the film gate.

In the event no unexposed frames of the film 110 remain following an exposure action or the camera user initiates early rewind of the film 110 into the film cartridge (not shown), or indications require rewind, rewinding of the film 110 into the film cartridge is initiated. Upon initiation of the rewind operation, the film presence sensor arm 84 is positioned to engage the film 110 in the film gate 112. FIG. 20 shows the positioning of the components of the differential gear mechanism 8 showing the film presence sensor arm 84 engaging the film 110 in the film gate 112.

With reference to FIG. 20, upon initiation of the rewind operation, the drive force of the motor (not shown) rotates the sun gear 40 in the counter clockwise direction, thereby causing the planetary gear 34 to rotate in the clockwise direction about the first post 21. In view of the unlocked drive spindle 10, the drive force of the motor is applied by the planetary gear 34 to the drive spindle 10, causing the drive spindle 10 to rotate in the counter clockwise direction. As a consequence, the film 110 is rewound about the film spool (not shown) in the film cartridge (not shown).

Additionally, upon initiation of the rewind operation, the torque control lever pin 66 engages the second tab 22 of the carrier plate 20. As noted above, in view of the unlocked drive spindle 10, the drive force of the motor is applied, via the sun gear 40 and the planetary gear 34, to the drive spindle 10. However, the clockwise rotation of the planetary gear also causes a clockwise torque force (as represented by the arrow 30) on the carrier plate 20 which causes the torque control lever pin 66 to ride up the inclined surface 33 of second tab 22. The movement of the torque control pin 66 causes the torque control lever 60 to rotate counter clockwise about the torque control shaft 70. As the torque control lever 60 rotates counter clockwise, the torque control lever gear sector 68, which is meshed with the sensor gear sector 82, causes the film presence sensor 80 to rotate in the clockwise direction about the sensor shaft 86. As a consequence, the film presence sensor arm 84 engages the film 110 in the film gate 112.

The film 110 in the film gate 112 prevents the film presence sensor 80 from rotating further into the film gate 112, thus preventing the torque control lever 60 from rotating further clockwise about the torque control shaft 70. As a result the torque control lever pin 66 is prevented from further riding up the inclined surface 33 of second tab 22, engages the second tab 22, and prevents the carrier plate 20 from rotating in the clockwise direction, thus "locking" the carrier plate 20.

Figure 21:
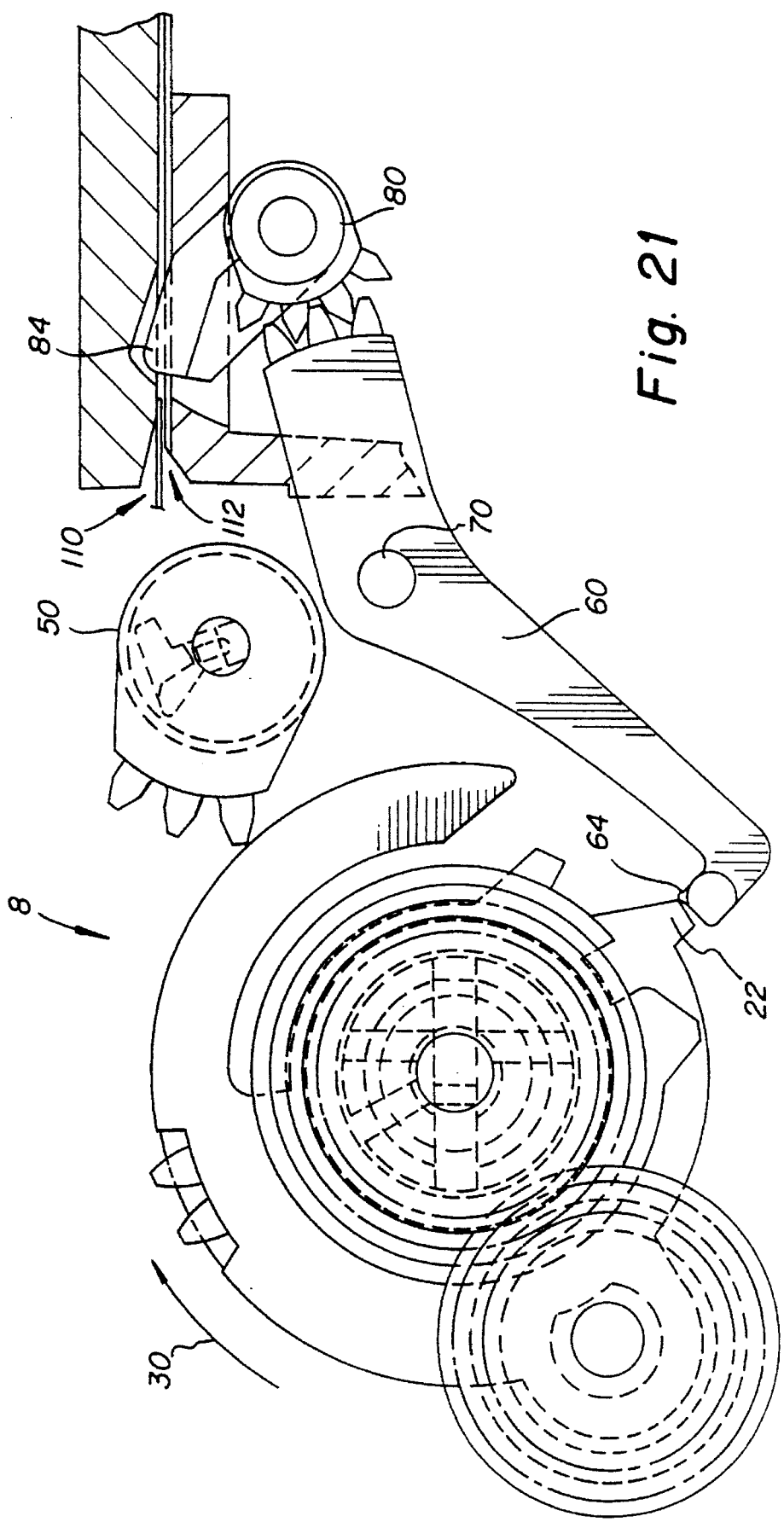
FIG. 21 is a top view of the components of the differential gear mechanism of FIG. 1, positioned during the rewinding of the film into the film cartridge, after the film has left the film gate and the film presence sensor arm no longer engages the film in the film gate.

In view of the locked carrier plate 20, the drive force of the motor is applied to the unlocked drive spindle 10, thereby causing the film spool to continue to rotate in the counter clockwise direction and rewind the film 110. Eventually, the film 110 leaves the film gate 112. FIG. 21 shows the positioning of the components of the differential gear mechanism 8 after the film 110 leave the film gate 112 and the film presence sensor arm 84 no longer engages the film 110 in the film gate 112. With reference to FIG. 21, when the film 110 leaves the film gate 112, the film presence sensor arm 84 no longer engages the film 110. In view of the torque on the carrier plate 20 (as represented by the arrow 30), the torque control lever pin 66 moves up the inclined surface 33 and over the second tab 22, which results in the torque control lever 60 rotating counter clockwise about the torque lever shaft 70, causing the film presence sensor 80 to rotate further clockwise about the film presence sensor shaft 86. The rotation of the film presence sensor 80 causes the film presence sensor arm 84 to rotate into the film gate 112.

As a consequence of the torque control lever pin 66 disengaging the second tab 22, the carrier plate 20 becomes unlocked and rotates clockwise in accordance with the torque on the carrier plate 20 (as represented by the arrow 30). In view of the unlocked carrier plate 20, the drive force of the motor is split between the drive spindle 10 and the carrier plate 20. As a result, the film 110 continues to rewind about the film spool in the film cartridge and the carrier plate 20 continues to rotate.

Figure 22:
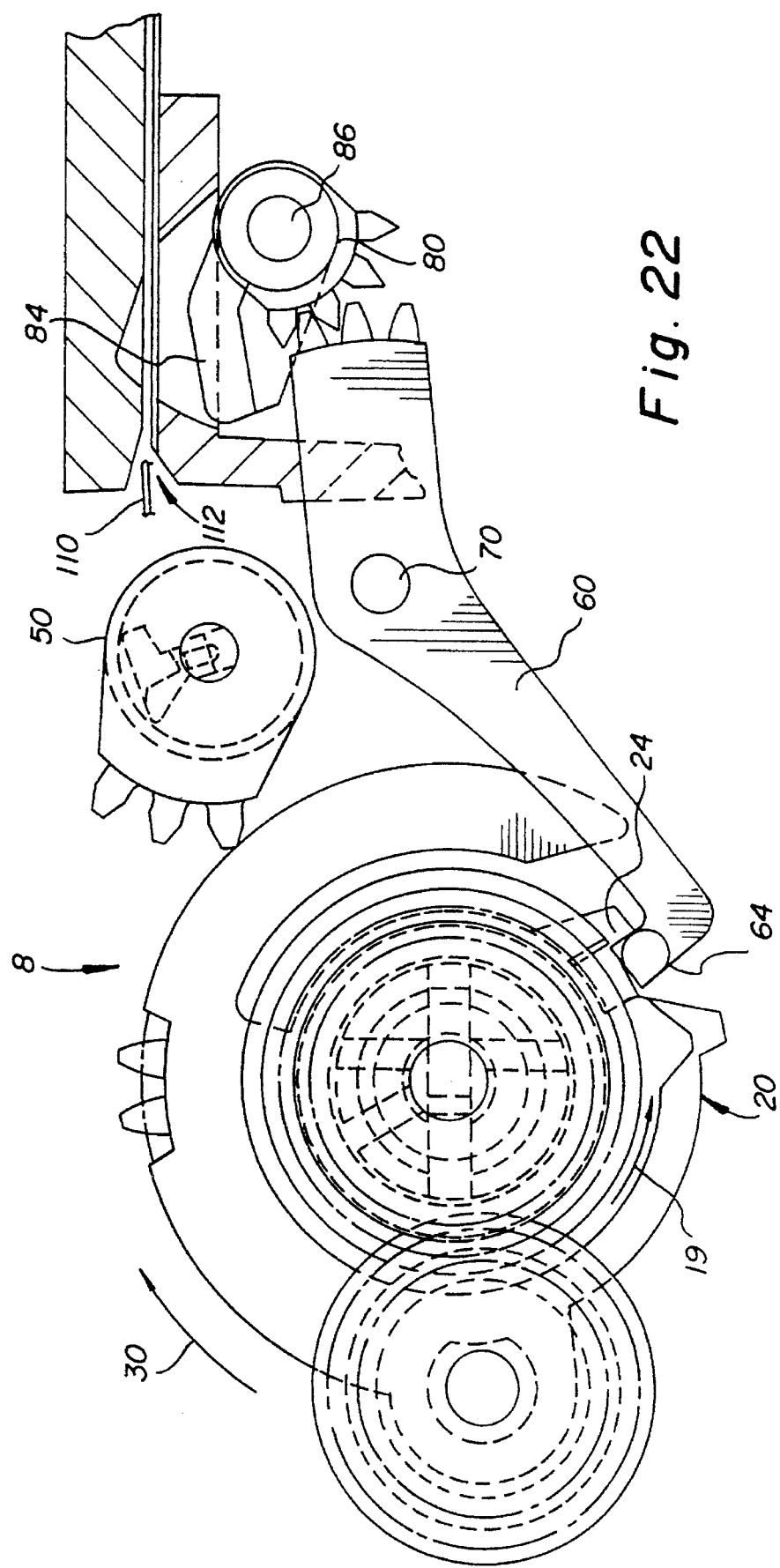
FIG. 22 is a top view of the components of the differential gear mechanism of FIG. 1, positioned during the rewinding of the film into the film cartridge, showing the carrier plate temporarily locked to allow the remaining film to be rewound into the film cartridge.

Before locking the drive spindle 10 and closing the film cartridge door, the drive spindle 10 should be allowed to rotate several times to ensure that the remaining film 110 is completely rewound about the film cartridge spool and does not block the film cartridge door. In order to ensure at least one rotation, and at most two rotations, of the drive spindle 10, the carrier plate 20 is temporarily locked. As should be appreciated by the following description, if the carrier plate 20 were not temporarily locked, the a circumstance arises that the pawl 64 could immediately engage the first notch 12 of the drive spindle 10 after the pawl 64 rides up and over the second tab 22. FIG. 22 shows the positioning of the components of the differential gear mechanism 8 where the carrier plate 20 is temporarily locked to allow the remaining film to be rewound into the film cartridge following the film 110 leaving the film gate 112.

With reference to FIGS. 21 and 22, after the torque control lever pin 66 disengages the second tab 22, the torque on the carrier plate 20 (as represented by the arrow 30) causes the carrier plate 20 to rotate in the clockwise direction. In view of the clockwise rotation of the carrier plate 20 and the bias on the torque control lever 60 to rotate clockwise about the torque control shaft 70 under the urging of a spring (not shown), the torque control lever pin 66 moves into the second notch 23 and engages the third tab 24 of carrier plate 20. As a result, the carrier plate 20 becomes locked and the drive force of the motor is fully applied to the drive spindle 10 (as represented by the arrow 19), causing the film spool to rotate and continue to rewind the film 110.

Additionally, with reference to FIGS. 21 and 22, the clockwise rotation of the torque control lever 60 about the torque control shaft 70, as the torque control lever pin 66 moves into the second notch 23 and engages the third tab 24, causes the film presence sensor 80 to rotate counter clockwise about the film presence sensor shaft 86. As a result, the film presence sensor arm 84 rotates out of the film gate 112.

Figure 23:
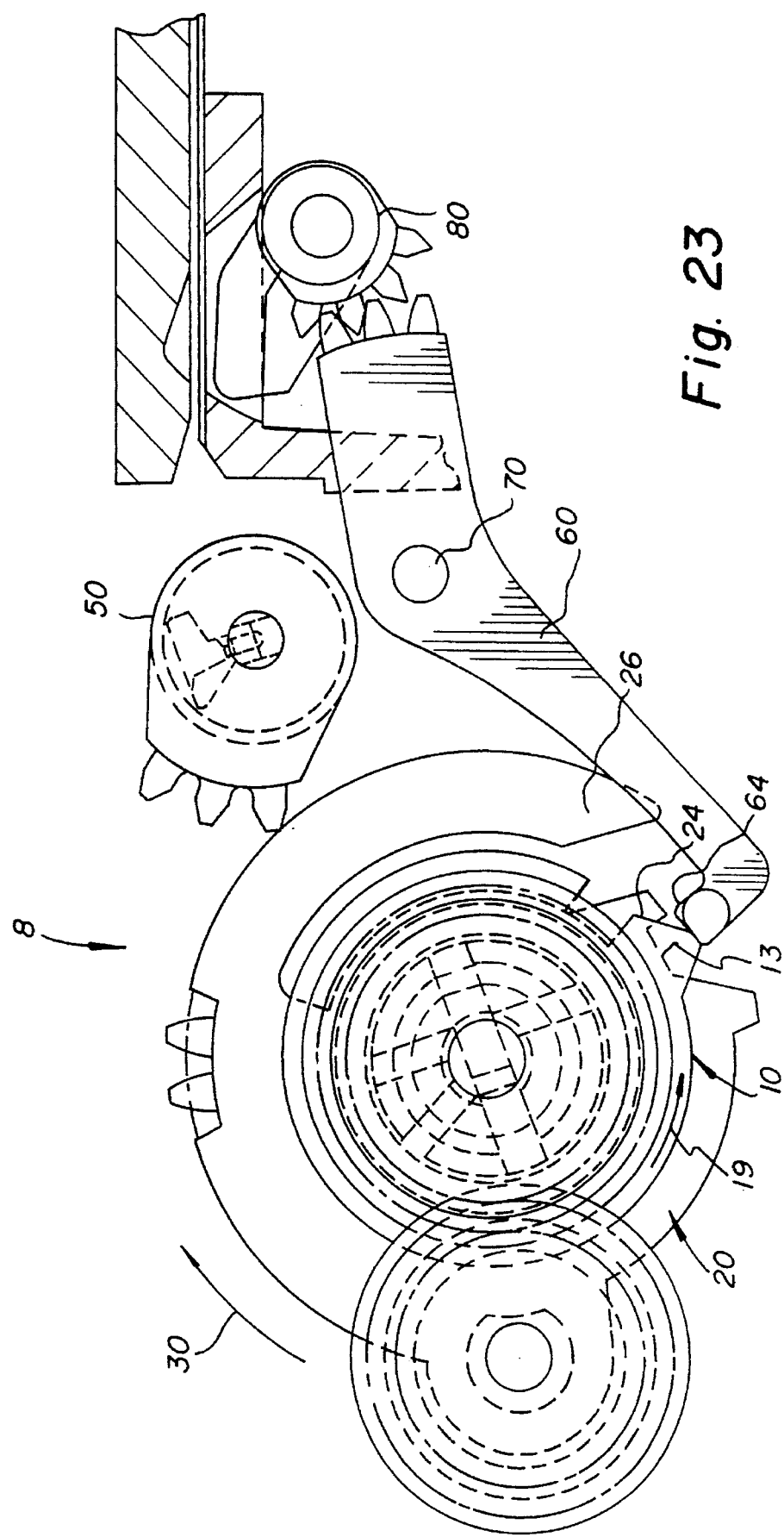
FIG. 23 is a top view of the components of the differential gear mechanism of FIG. 1, positioned during the rewinding of the film into the film cartridge, showing the unlatching of the film return safety latch.

The carrier plate 20 remains locked until the first tab 13 of the drive spindle 10 engages the pawl 64 and ejects the torque control lever pin 66 from the second notch 23. FIG. 23 shows the positioning of the components of the differential gear mechanism 8 where the carrier plate 20 becomes unlocked.

With reference to FIGS. 22 and 23, as the drive spindle 10 continues to rotate counter clockwise (as represented by the arrow 19), the first tab 13 of the drive spindle 10 eventually engages the pawl 64 causing the torque control lever 60 to rotate counter clockwise about the torque control shaft 86. As a result, the torque control lever pin 66 is ejected from the second notch 23 and disengages from the third tab 24 of the carrier plate 20. As a result, the carrier plate 20 become unlocked and rotates in the clockwise direction due to the torque on the carrier plate 20 (as represented by the arrow 30). In view of the unlocked carrier plate 20, the drive force of the motor is split between the drive spindle 10 and the carrier plate 20. As a result, the film 110 continues to rewind about the film spool in the film cartridge and the carrier plate 20 continues to rotate.

Figure 24:
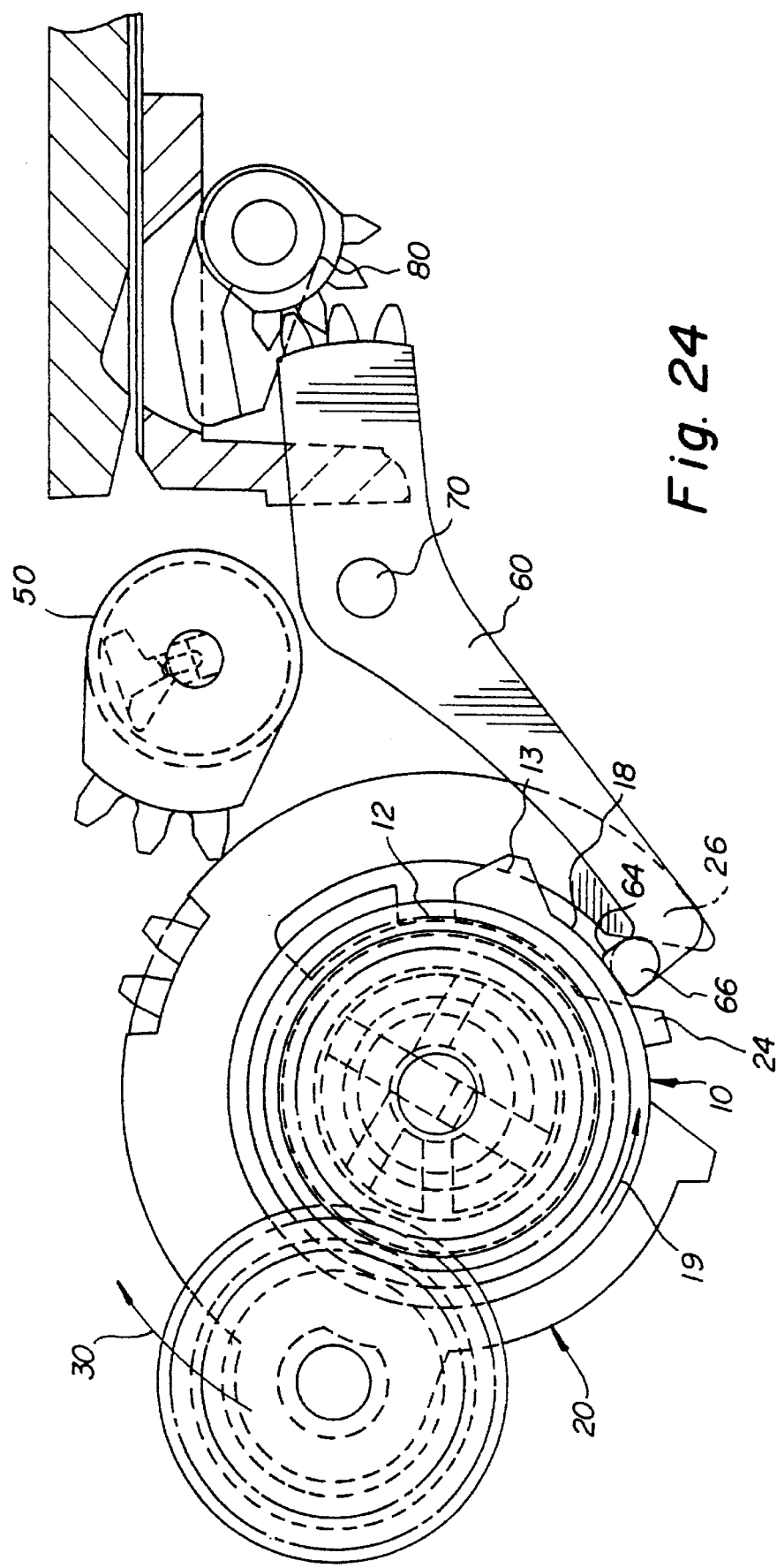
FIG. 24 is a top view of the components of the differential gear mechanism of FIG. 1, positioned during the rewind of the film into the film cartridge, showing the carrier timing stop.

With reference to FIGS. 23 and 24, as the first tab 13 engages the pawl 64, the drive spindle 10 continues to rotate counter clockwise (as represented by the arrow 19) and, as a result, the pawl 64 moves up and over the first tab 13. In view of the bias on the torque control lever 60 to rotate clockwise about the torque control shaft 86 under the urging of a spring (not shown), the pawl 64 engages the outer surface 18 of the lower plate 15 of the drive spindle 10. The unlocked carrier plate 20 continues to rotate in the clockwise direction due to the torque on the carrier plate 20 (as represented by the arrow 30) until the finger 26 engages the torque control lever pin 66, thereby preventing the carrier plate 20 from rotating further in the clockwise direction. As a result, the carrier plate 20 becomes locked and the drive force of the motor is fully applied to the drive spindle 10 (as represented by the arrow 19), causing the film spool to rotate and continue to rewind the film.

Figure 25:
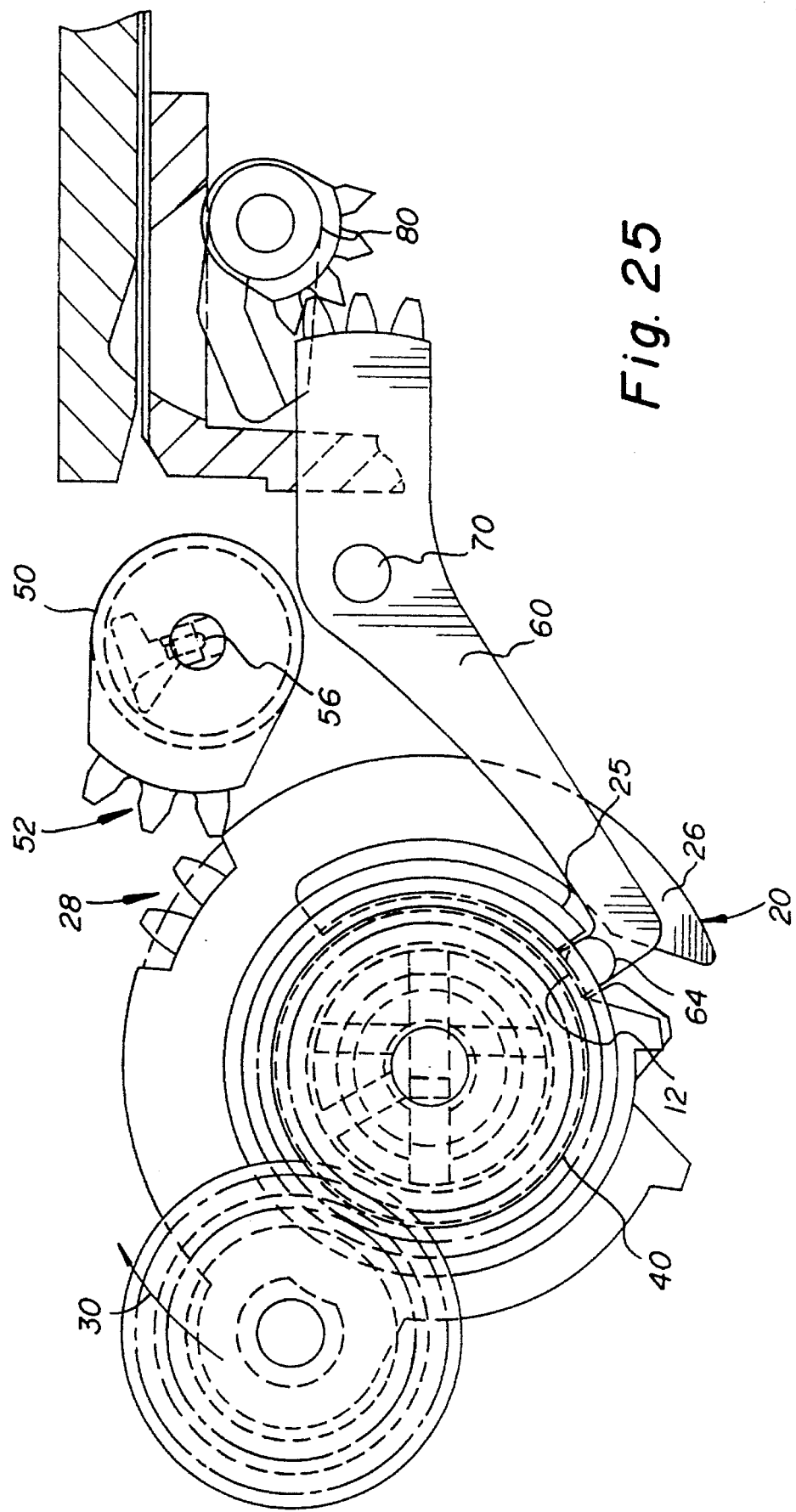
FIG. 25 is a top view of the components of the differential gear mechanism of FIG. 1, positioned where the drive spindle is locked and the drive key is in the open position.

With reference to FIGS. 24 and 25, as stated above the torque control lever 60 is biased to rotate clockwise about the torque control shaft 70 under the urging of a spring (not shown). Thus, as the drive spindle 10 rotate counter clockwise, the pawl 64 engages the outer surface 18 until the pawl 64 senses the first notch 12. Upon the pawl 66 sensing the first notch 12 and the torque control lever pin 66 being in the slot 25, the torque control lever 60 is allowed to rotate clockwise about the torque control shaft 70 under the urging of a spring (not shown) and the pawl 64 engages the first notch 12. As a result, the drive spindle 10 becomes locked. Additionally, due to the clockwise rotation of the torque control lever 60, the torque control lever pin 66 no longer engages the finger 26, and as a result, the carrier plate 20 becomes unlocked.

Figure 26:
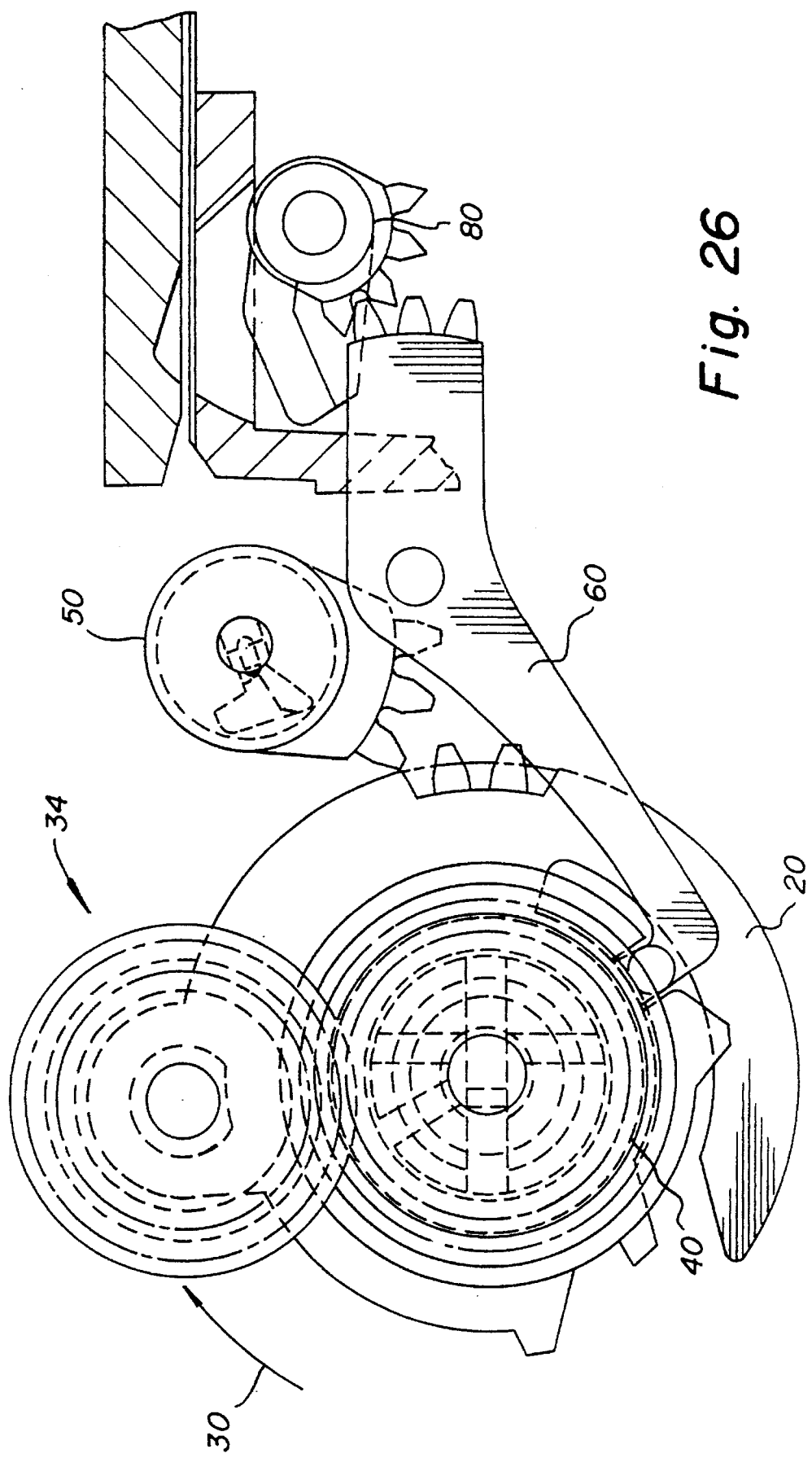
FIG. 26 is a top view of the components of the differential gear mechanism of FIG. 1, positioned where the drive spindle is locked and the drive key is in the closed position.

The film (not shown) is now fully rewound on the film spool (not shown) contained within the film cartridge (not shown) and the film cartridge door (not shown) can now be closed. FIG. 25 shows the positioning of the components of the differential gear mechanism 8 where the drive spindle 10 is locked and the drive key 54 is in the open position. FIG. 26 shows the positioning of the components of the differential gear mechanism 8 where the drive spindle 10 is locked and the drive key 54 is in the closed position.

With reference to FIGS. 25 and 26, the drive force of the motor (not shown) is now fully transferred to the unlocked carrier plate 20 due to the drive spindle 10 being locked. Specifically, the drive force of the motor (not shown) causes the sun gear 40 to rotate in the counter clockwise direction thereby causing the planetary gear 34 to rotate in the clockwise direction. As a result, the carrier plate 20 rotates clockwise about the circumference of the drive spindle gear 14. Initially, the drive gear sector 52 contacts a second portion of the carrier plate 20 which has no gear teeth until the carrier plate gear sector 28 engages with the drive gear sector 52, thus producing a second desired time delay. The purpose of the dwell time is to allow other camera operations to be performed, including other camera operations by the differential gear mechanism, before the cartridge door is closed. As the carrier plate 20 continues to rotate clockwise, the carrier plate gear sector 28 engages the drive gear sector 52, which causes the drive gear 50 to rotate counter clockwise about the drive gear shaft 56. As shown in FIG. 26, the counter clockwise rotation of the drive gear 50 causes the drive key 54 to move to the closed position which causes the film cartridge door (not shown) to close. Once the film cartridge door is closed, the carrier plate gear sector 28 disengages from the drive gear sector 52, whereupon the drive gear sector 52 contacts a first portion of the carrier plate 20 which has no gear teeth. The film rewinding operation is now complete.

FILM CARTRIDGE UNLOADING

The film cartridge unloading operation may begin upon completion of the film rewinding operation. Initiation of this operation can occur automatically upon completion of the film rewind operation or manually by the camera user. Preferably, the film unloading operation occurs automatically following completion of the film rewinding operation, thereby providing immediate unloading of the film cartridge.

FIG. 26 shows the positioning of components of the differential gear mechanism immediately following completion of the film rewinding operation. Upon initiation of the film cartridge unloading operation, the drive force of the motor (not shown) causes the sun gear 40 to rotate in a counter clockwise direction. As a result, the planetary gear 34 rotates clockwise about the spindle gear 14 due to the drive gear 10 being locked, thereby causing the carrier plate 20 to rotate in the clockwise direction.

As the carrier plate 20 continues to rotate, the carrier plate 20 can perform other camera operations associated with returning the film cartridge to the camera user. Preferably, the carrier plate 20 opens the camera door and/or initiates ejection of the film cartridge from a loading chamber, either automatically following rewind of the film into the film cartridge or upon camera user initiation.

Figure 27:
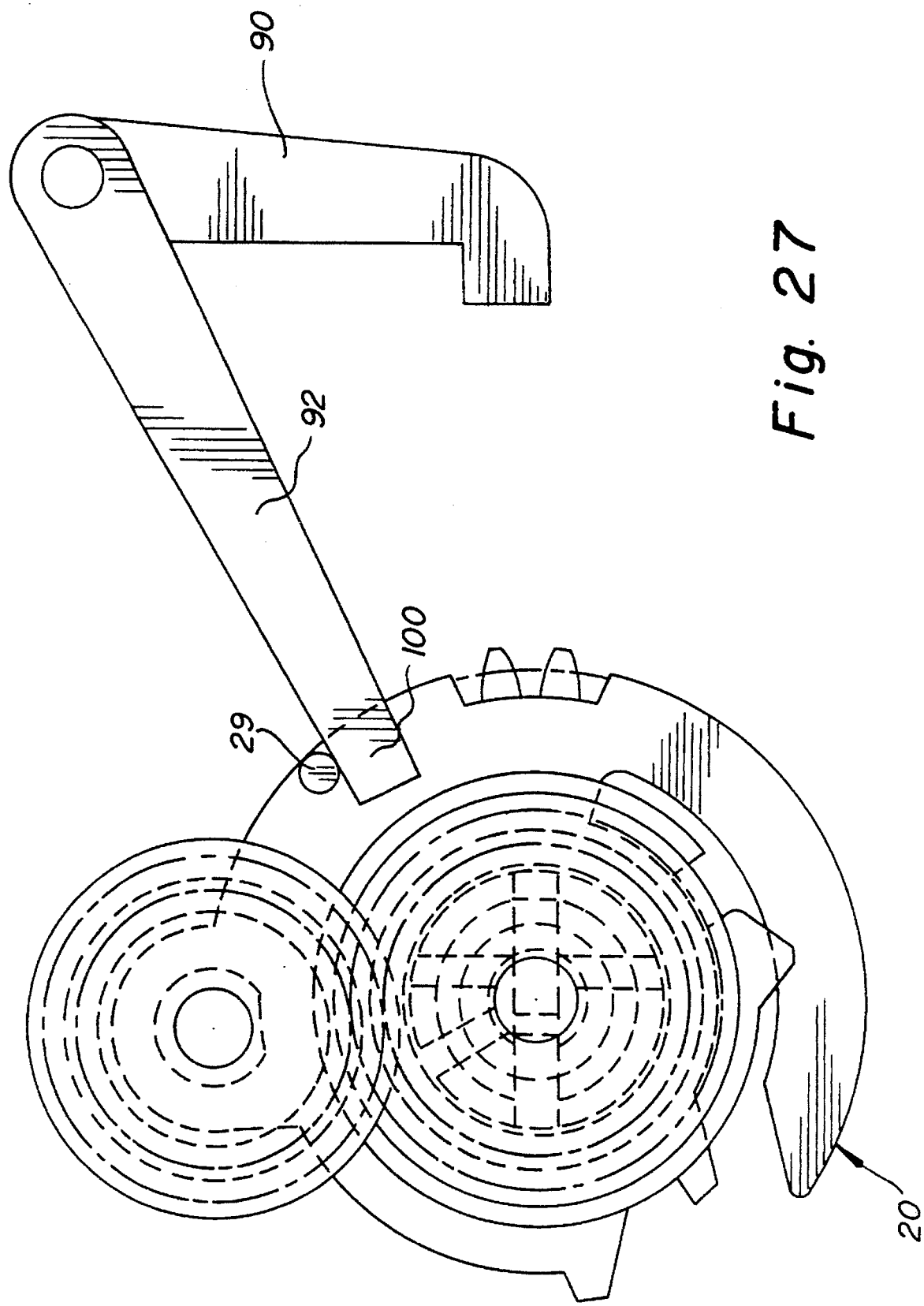
FIG. 27 is a top view of some of the components of the differential gear mechanism of FIG. 1, showing the initial latched position of the camera door lever.
Figure 28:
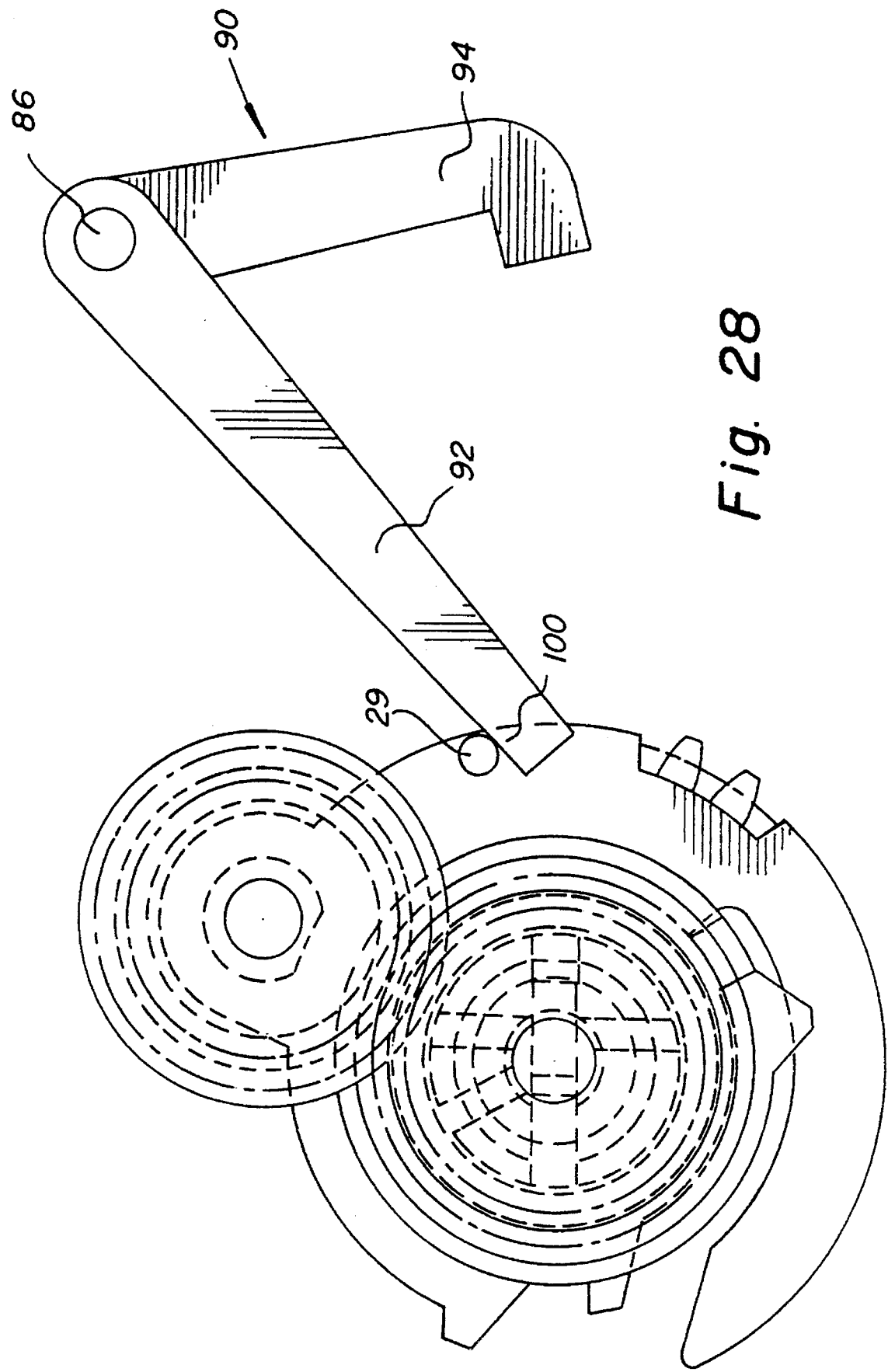
FIG. 28 is a top view of some of the components of the differential gear mechanism of FIG. 1, showing final unlatched position of the camera door lever.

For example, with reference to FIG. 27, as the carrier plate 20 rotates, the door release pin 29 of carrier plate 20 engages the first end 100 of first arm 92 of camera door lever 90. As is shown in more detail in FIG. 16, the camera door lever includes a post 96 which runs the length of a loading chamber (not shown) designed to receive a film cartridge endwise, i.e. axially. As shown in FIG. 28, the carrier plate 20 rotates, the door release pin 29 pushes against the first end 100 of the first arm 92, which causes the camera door lever 90 to rotate counter clockwise about camera door lever post 86. As the second arm 94 of camera door lever 90 rotates counter clockwise, the lock 98 disengages from the camera door (not shown) and the camera door is allowed to open.

With specific reference to FIG. 26, as the carrier plate 20 continues to rotate, the drive gear sector 52 contacts the outer diameter of the carrier plate 20. A time delay is available, between when the carrier plate gear sector 28 disengages from the drive gear sector 52 and the time when door release pin 29 contacts the first end 88, to perform other camera functions, including functions performed by the differential gear mechanism of the present invention.

Figure 29:
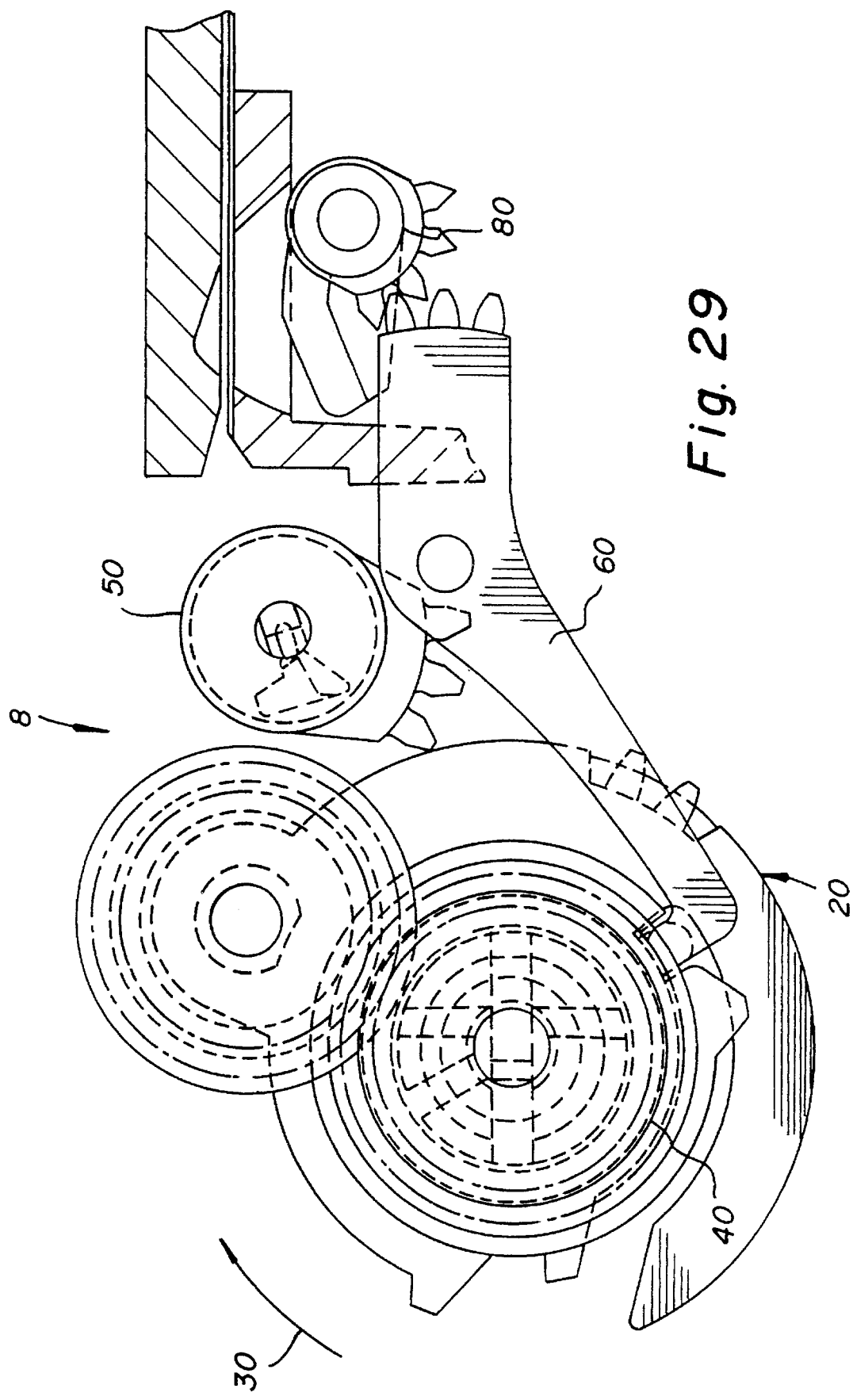
FIG. 29 is a top view of the components of the differential gear mechanism of FIG. 1, showing the components of the differential gear mechanism after the camera door has been unlatched.
Figure 30:
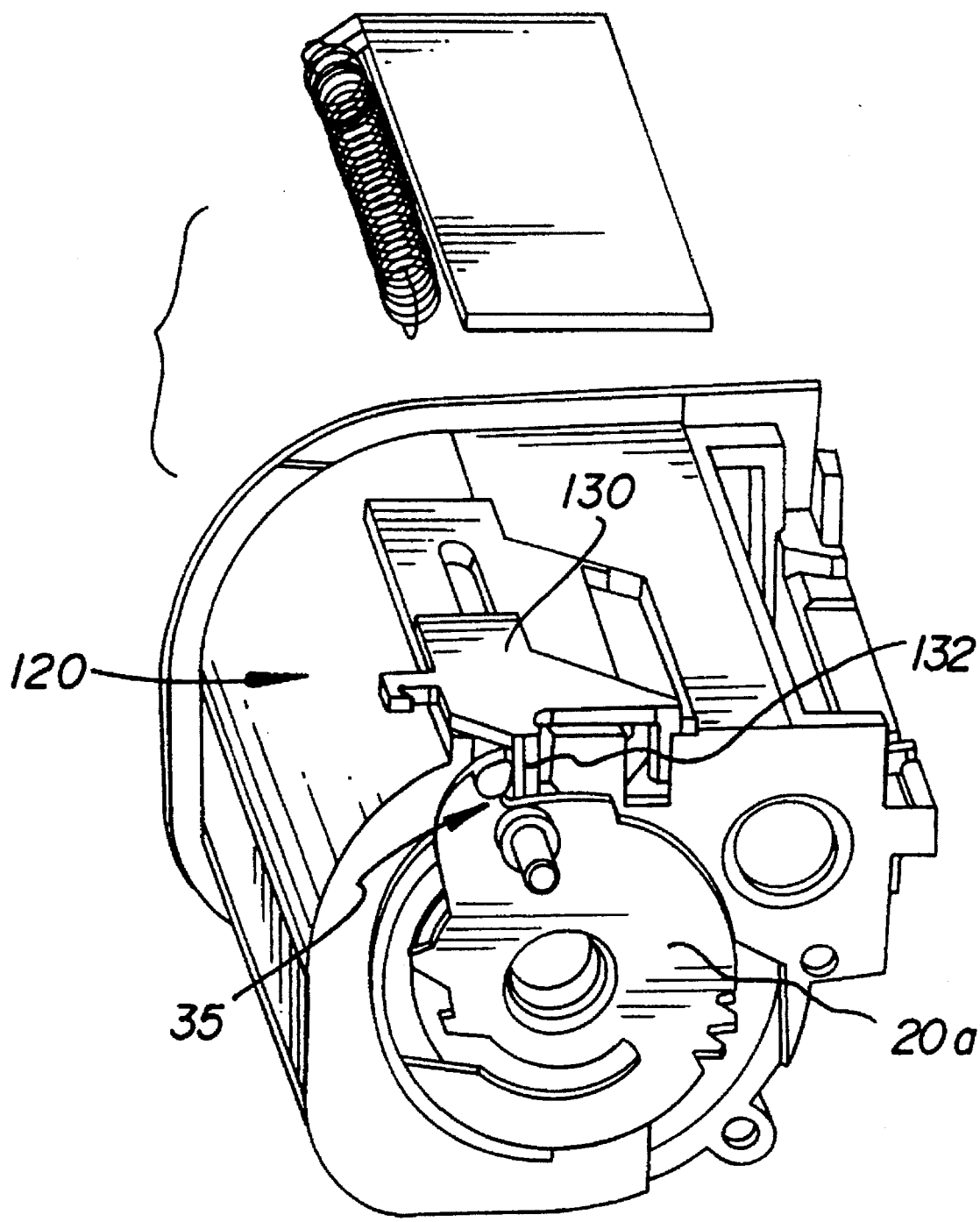
FIG. 30 is a perspective view of a loading chamber showing the alternative embodiment of the carrier plate apart from the differential gear mechanism of FIG. 1.
Figure 31:
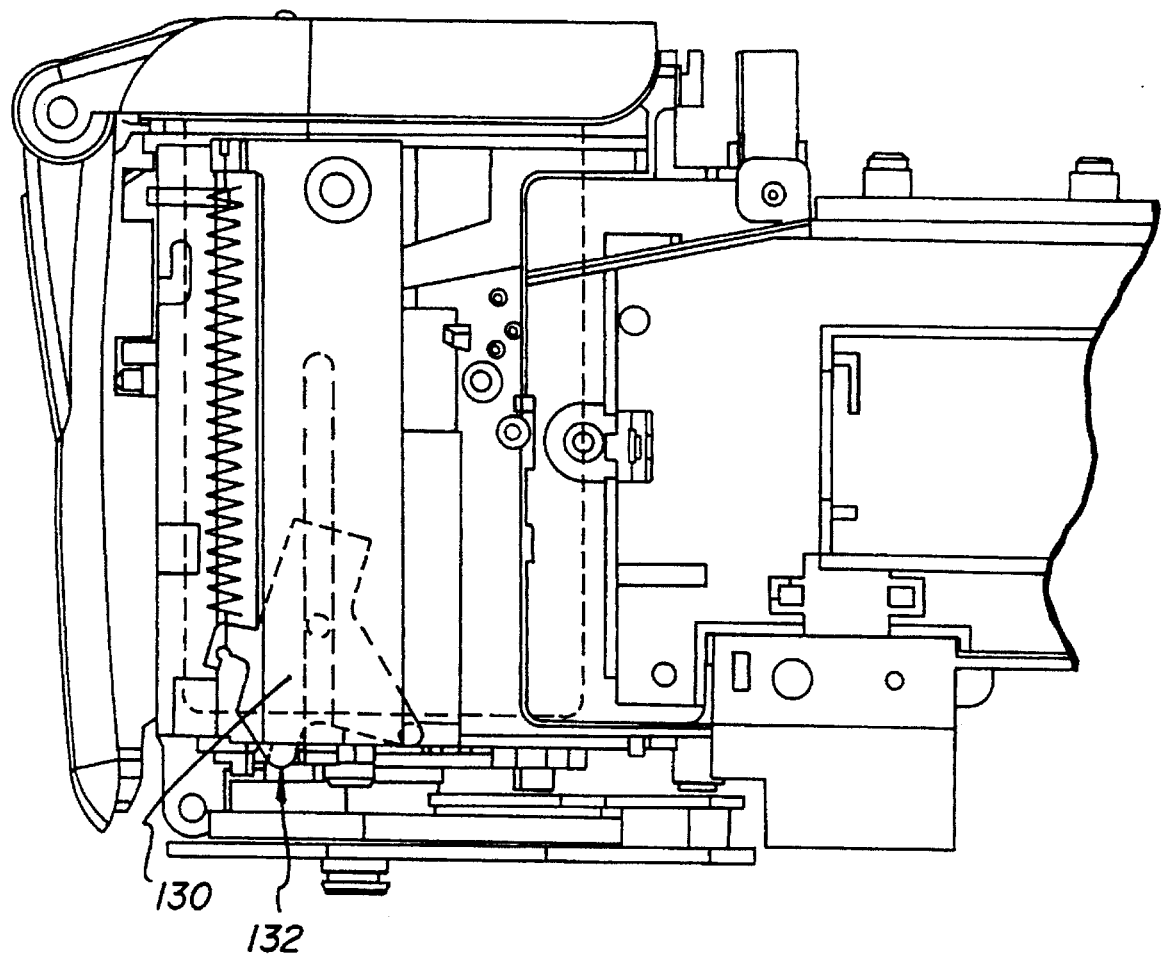
FIG. 31 is a side view of the loading chamber shown in FIG. 30.

FIG. 29 shows the positioning of the components of the differential gear mechanism 8 after the carrier plate 20 has rotated clockwise a sufficient distance to allow the lock 98 to disengage from the camera door. As the carrier plate 20 rotates further, as shown in FIGS. 30 and 31, the carrier plate 20 can next initiate ejection of the film cartridge (not shown) from a loading chamber 120. With reference to the alternative embodiment of the carrier plate 20a, the carrier plate 20a includes an ejection release pin 35. Preferably, as shown in FIGS. 30 and 31, the differential gear mechanism 8 is used in conjunction with the ejection mechanism described in commonly assigned application entitled FILM CARTRIDGE EJECTOR FOR PHOTOGRAPHIC SYSTEM. As the carrier plate 20a continues to rotate, the ejection release pin 35 contacts a latched pin 132 on a ejection slide 130 and causes the pin 132 to become unlatched. As a consequence, the ejector slide 130 engages the film cartridge (not shown) in the loading chamber 120 and ejects the film cartridge at least partially away from the loading chamber 120.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

| ELEMENTS IDENTIFIED BY REFERENCE NUMERAL | |
| --- | --- |
| Reference Numeral | Element |
| 8 | differential gear mechanism |
| 10 | drive spindle |
| 12 | first notch |
| 13 | first tab |
| 14 | spindle gear |
| 15 | lower plate |
| 16 | upper pin |
| 17 | lower pin |
| 18 | outer surface of drive spindle |
| 19 | drive spindle direction arrow |
| 20 | carrier plate |
| 21 | first post |
| 22 | second tab |
| 23 | second notch |
| 24 | third tab |
| 25 | slot |
| 26 | finger |
| 27 | second post |
| 28 | carrier plate gear sector |
| 29 | door release pin |
| 30 | carrier plate torque arrow |
| 31 | ramped surface of second tab |
| 32 | ramped surface of third tab |
| 33 | inclined surface of second tab |
| 34 | planetary gear |
| 35 | ejection release post |
| 36 | upper gear |
| 38 | lower gear |
| 40 | sun gear |
| 50 | drive gear |
| 52 | drive gear sector |
| 54 | drive key |
| 56 | drive gear shaft |
| 60 | torque control lever |
| 62 | lever |
| 64 | pawl |
| 66 | torque control lever pin |
| 68 | torque control lever gear sector |
| 70 | torque control shaft |
| 80 | film presence sensor |
| 82 | film presence sensor gear sector |
| 84 | film presence sensor arm |
| 86 | film presence sensor shaft |
| 90 | camera door lever |
| 92 | first arm |
| 94 | second arm |
| 96 | post |
| 98 | lock |
| 100 | first end of first arm |
| 110 | film |
| 112 | film gate |
| 120 | loading chamber |
| 130 | ejector slide |
| 132 | ejector slide pin |
| 140 | center line of spindle gear |
| 142 | dedendum line of spindle gear |
| 144 | addendum line of spindle gear |
| 360 | center line of upper planetary gear |
| 362 | dedendum line of upper planetary gear |
| 364 | addendum line of upper planetary gear |
| 380 | center line of lower planetary gear |
| 382 | dedendum line of lower planetary gear |
| 384 | addendum line of lower planetary gear |
| 420 | center line of sun gear |
| 422 | dedendum line of sun gear |
| 424 | addendum line of sun gear |

What is claimed is:

1. A differential gear mechanism employing a single drive mechanism to advance and rewind photographic film wound about a spool contained within a film cartridge, the film cartridge employing a light lock mechanism movable between an opened and closed position, said differential gear mechanism comprising:

13

(a) first means for moving the light lock mechanism to either the opened position or the closed position;

(b) spindle means for rotating the spool to advance or rewind the film through the opening in the film cartridge resulting from the moving of the light lock mechanism to the opened position;

(c) second means for rotating said first means about a first axis;

(d) first gear means for rotating one or both of said spindle means or said second means about a second axis;

(e) third means for selectively allowing or preventing one or both of said spindle means or said first means to rotate;

(f) second gear means for transferring the drive force of said single drive mechanism to said first gear means to rotate about a third axis.

2. A differential gear mechanism as set forth in claim 1, wherein said first gear means is rotatably positioned on said second means.

3. A differential gear mechanism as set forth in claim 1, wherein said second gear means is rotatably positioned on said spindle means.

4. A differential gear mechanism as set forth in claim 1, wherein said second means is rotatably positioned on said spindle means.

5. A differential gear mechanism as set forth in claim 1, wherein said first gear means further comprises an upper gear means and a lower gear means, wherein said upper means is meshed with said second gear means and said lower gear means is meshed with said spindle means.

6. A differential gear mechanism as set forth in claim 1, wherein said first axis, said second axis and said third axis are parallel.

7. A differential gear mechanism as set forth in claim 1, wherein said first means comprises a drive gear, said spindle means comprises a drive spindle, said second means comprises a carrier plate, said first gear means comprises a planetary gear, said third means comprises a torque control lever, and said second gear means comprises a sun gear.

8. A differential gear mechanism for a photographic system using photographic film contained within a cartridge, said cartridge having an opening for allowing the exit of the film and a closure mechanism movable between a closed position and an open position, said differential gear mechanism comprising:

(a) a sun gear rotatable about a first axis;

(b) a planetary gear rotatable about a second axis by said sun gear;

(c) a drive spindle rotatable about said first axis by said planetary gear for advancing the film from the cartridge or rewinding the film into the cartridge;

(d) a carrier plate rotatable about said first axis by said planetary gear which is operably connected to the closure mechanism; and (e) a torque control lever which selective locks or releases one or both of said drive spindle or said carrier plate so that said planetary gear can selectively rotate one or both of said drive spindle or said carrier plate.

9. A differential gear mechanism as set forth in claim 8, wherein said sun gear is rotated by a motor.

10. A differential gear mechanism as set forth in claim 8, further comprising a drive gear rotatable about a third axis by said carrier plate for moving the door of the cartridge to one of either the open position or the closed position.

11. A differential gear mechanism as set forth in claim 8, wherein said drive spindle further comprises an upper pin

14 upon which said sun gear is rotatable, a lower pin upon which said carrier plate is rotatable and which engages the cartridge, a spindle gear which is meshed with said planetary gear and a first notch which is selectively engagable by said torque control lever for locking or releasing said drive spindle.

12. A differential gear mechanism as set forth in claim 8, wherein said planetary gear further comprises a first gear meshed with said sun gear and a second gear meshed with said drive spindle.

13. A differential gear mechanism as set forth in claim 8, wherein said carrier plate further comprises a post upon which said planetary gear is rotatable and a second tab which is selectively engaged by said torque control lever for locking or releasing said carrier plate.

14. A differential gear mechanism, as claimed in claim 8, wherein said torque control lever further comprises a pawl for selectively locking said drive spindle and a pin for selectively locking said carrier plate.

15. A differential gear mechanism, as claimed in claim 8, wherein said drive gear further comprises a gear sector, which is meshed with said carrier plate, and a drive key which engages the door of the cartridge to position the door in one of either the open position or the closed position.

16. A differential gear mechanism, as claimed in claim 8, further comprising sensor means, which is meshed with said torque control lever, for detecting the presence or absence of film in a film gate in the photographic system.

17. A differential gear mechanism as set forth in claim 8, wherein said carrier plate further comprises a post for engaging a camera door opening mechanism of the photographic system.

18. A differential gear mechanism as set forth in claim 8, wherein said carrier plate further comprises a pin for engaging a film cartridge ejector mechanism of the photographic system.

19. A differential gear mechanism comprising:

(a) a sun gear which is rotatable about a first axis;

(b) a planetary gear which is rotatable about a second axis by said sun gear, wherein said planetary gear comprises a first gear meshed with said sun gear and a second gear;

(c) a drive spindle which is rotatable about said first axis by said planetary gear, said drive spindle comprising an upper pin upon which said sun gear is rotatable about, a lower pin, and a spindle gear which is meshed with said second gear of said planetary gear;

(d) a carrier plate on which said planetary gear is rotatably mounted and which is rotatable about said first axis, wherein said carrier plate is rotatably positioned about said lower pin, wherein said carrier plate further comprises a post upon which said planetary gear is rotatably positioned;

(e) a torque control lever for selectively locking or releasing one or both of said drive spindle or said carrier plate, wherein said torque control lever comprises a pawl for selectively locking said drive spindle and a pin for selectively locking said carrier plate; and (f) a drive gear which is rotatable about a third axis by said carrier plate, wherein said drive gear comprises a gear sector, which is meshed with said carrier plate, and a drive key.

20. A method of employing a single drive mechanism to accomplish advancing and rewinding of photographic film contained within a film cartridge, the film cartridge employing a light lock mechanism movable between an open and closed position, said method comprising the steps of:

(a) driving a first drive mechanism that is operatively interconnected with a light lock opening mechanism to move the light lock mechanism to the open position;

(b) employing said first drive mechanism that is operatively interconnected to a film advancing mechanism to advance a first end of the film through the opening in the film cartridge resulting from the moving of the light lock mechanism to the open position;

(c) employing said first drive mechanism to advance the film through the opening in the film cartridge in a framewise manner;

(d) employing said first drive mechanism that is operatively interconnected to a film rewinding mechanism to rewind the film through the opening in the film cartridge and into the film cartridge until the film is positioned entirely within the film cartridge; and (e) employing said first drive mechanism that is operatively interconnected with a light lock closing mechanism to move the light lock mechanism to the closed position.

21. A method as set forth in claim 20, wherein said first drive mechanism comprises a sun gear.

22. A method as set forth in claim 20, wherein said light lock opening mechanism comprises:

(a) a planetary gear rotatable by said first drive mechanism;

(b) a drive spindle which is rotatable by said planetary gear;

(c) a torque control lever which engages said drive spindle to prevent said drive spindle from rotating;

(d) a carrier plate which is rotatable by said planetary gear for positioning the light lock mechanism in the opened position.

23. A method as set forth in claim 20, wherein said light lock closing mechanism comprises:

(a) a planetary gear rotatable by said first drive mechanism;

(b) a drive spindle which is rotatable by said planetary gear;

(c) a torque control lever which engages said drive spindle to prevent said drive spindle from rotating;

(d) a carrier plate which is rotatable by said planetary gear for positioning the light lock mechanism in the closed position.

24. A method as set forth in claim 20, wherein said film advancing mechanism comprises:

(a) a planetary gear rotatable in accordance with the rotation of said first drive mechanism;

(b) a drive spindle which is rotatable by said planetary gear and operatively connected to the film cartridge; and (c) torque control lever which does not engage said drive spindle so that said drive spindle is rotatable by said planetary gear to advance the film from the cartridge.

25. A method as set forth in claim 20, wherein said film rewinding mechanism comprises:

(a) a planetary gear rotatable by said first drive mechanism;

(b) a drive spindle which is rotatable by said planetary gear and operatively connected to the film cartridge;

(c) a carrier plate which is rotatable by the rotation of said planetary gear; and (d) a torque control lever which does not engage said drive spindle so that said drive spindle is rotatable by said planetary gear to rewind the film into the cartridge, and engages said carrier plate preventing said carrier plate from rotating.

26. A method as set forth in claim 20, wherein said step of advancing the film through the opening in the film cartridge in a framewise manner is in response to completion of an exposure action.

* * * * *